(12) United States Patent
Kitamura

(10) Patent No.: US 10,563,725 B2
(45) Date of Patent: Feb. 18, 2020

(54) BALANCER APPARATUS FOR INTERNAL COMBUSTION ENGINE

(71) Applicant: HITACHI AUTOMOTIVE SYSTEMS, LTD., Hitachinaka-shi, Ibaraki (JP)

(72) Inventor: Masaharu Kitamura, Atsugi (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 122 days.

(21) Appl. No.: 15/577,248

(22) PCT Filed: May 11, 2016

(86) PCT No.: PCT/JP2016/063953
§ 371 (c)(1),
(2) Date: Nov. 27, 2017

(87) PCT Pub. No.: WO2016/190098
PCT Pub. Date: Dec. 1, 2016

(65) Prior Publication Data
US 2018/0163816 A1 Jun. 14, 2018

(30) Foreign Application Priority Data
May 28, 2015 (JP) .................. 2015-108046

(51) Int. Cl.
*F16F 15/26* (2006.01)
*F16C 19/26* (2006.01)
(Continued)

(52) U.S. Cl.
CPC .............. *F16F 15/26* (2013.01); *F16C 3/20* (2013.01); *F16C 19/26* (2013.01); *F16C 19/466* (2013.01); *F16C 2360/22* (2013.01)

(58) Field of Classification Search
CPC ........ F16F 15/26; F16F 15/264; F16F 15/265; F16C 19/466; F16C 19/26; F16C 3/20;
(Continued)

(56) References Cited

U.S. PATENT DOCUMENTS 4,411,227 A * 10/1983 Feichtinger .............. F01M 1/02
  123/195 R
5,497,747 A * 3/1996 Nakano ................... F02B 67/00
  123/363

(Continued)

FOREIGN PATENT DOCUMENTS

JP 2005-043089 A 2/2005
JP 3730064 B2 12/2005
(Continued)

OTHER PUBLICATIONS

Machine translation, Detailed Description of JP2010-230129A, Hashimoto et al., publ'n date Oct. 14, 2010, pp. 1-39.*

*Primary Examiner* — Grant Moubry
(74) *Attorney, Agent, or Firm* — Foley & Lardner LLP

(57) ABSTRACT

An object of the present invention is to provide a balancer apparatus for an internal combustion engine that can improve design flexibility in the internal combustion engine. The balancer apparatus includes left and right balancer shafts 21L and 21R each including a balancer weight 21*a* and a rear-side shaft portion 19*b* and a front-side shaft portion 19*a* provided on both sides of the weight portion 21*a* in a rotational axis direction, a rear-side housing 22R including a bearing holding portion 22Rd surrounding an outer periphery of the rear-side shaft portion 19*b* and rotatably supporting the rear-side shaft portion 19*b*, and a front-side housing 22F including a bearing holding portion 22Fd rotatably supporting the front-side shaft portion 19*a*.

7 Claims, 17 Drawing Sheets

(51) Int. Cl.
*F16C 3/20* (2006.01)
*F16C 19/46* (2006.01)

(58) Field of Classification Search
CPC ...... F16C 2360/22; F02B 75/06; F02B 75/20; F02B 67/00; F02B 77/00; F02F 7/00
See application file for complete search history.

(56) References Cited

U.S. PATENT DOCUMENTS

| | | | | |
|---|---|---|---|---|
| 5,588,406 | A * | 12/1996 | Ito | F01L 1/047 123/90.34 |
| 5,934,234 | A * | 8/1999 | Shichinohe | F01L 1/02 123/90.31 |
| 6,067,950 | A * | 5/2000 | Kinoshita | F02B 61/045 123/192.2 |
| 6,257,192 | B1 * | 7/2001 | Yamaura | F01M 1/06 123/196 R |
| 6,302,077 | B1 * | 10/2001 | Safarik | F02B 61/02 123/192.2 |
| 6,318,333 | B1 * | 11/2001 | Narita | F01M 1/02 123/196 R |
| 6,332,444 | B1 * | 12/2001 | Narita | F01M 1/12 123/196 R |
| 6,523,627 | B2 * | 2/2003 | Fukuda | F01P 5/12 123/198 C |
| 6,626,139 | B1 * | 9/2003 | Horita | F16F 15/12 123/192.2 |
| 8,387,583 | B2 * | 3/2013 | Kato | F16F 15/267 123/192.2 |
| 2010/0132654 | A1 * | 6/2010 | Lee | F02B 75/06 123/192.2 |
| 2010/0186706 | A1 * | 7/2010 | Okada | F01M 9/06 123/192.2 |
| 2011/0253091 | A1 * | 10/2011 | Hashimoto | F01M 1/02 123/192.2 |

FOREIGN PATENT DOCUMENTS

| | | |
|---|---|---|
| JP | 3155809 U | 11/2009 |
| JP | 5186424 B2 | 4/2013 |
| JP | 2015-025481 A | 2/2015 |

* cited by examiner

BALANCER APPARATUS FOR INTERNAL COMBUSTION ENGINE

TECHNICAL FIELD

The present invention relates to a balancer apparatus for an internal combustion engine.

BACKGROUND ART

A balancer apparatus discussed in PTL 1 employs an aluminum die-cast product casted integrally as a whole as a housing containing a balancer shaft therein. The balancer shaft is mounted in the housing by being inserted in a rotational axis direction from one of two bearing portions provided on the housing.

CITATION LIST

Patent Literature

PTL 1: Japanese Patent No. 5186424

SUMMARY OF INVENTION

Technical Problem

According to the above-described conventional balancer apparatus, an outermost diameter of the balancer shaft is limited by an inner diameter of the bearing portion due to the structure in which the balancer shaft is inserted into the housing via the bearing portion. Therefore, the balancer shaft should have an elongated axial length to secure a required unbalance amount. The elongated axial length of the balancer shaft leads to an increase in constraints on a layout among other components, thereby raising a possibility of limiting design flexibility in an internal combustion engine.

An object of the present invention is to provide a balancer apparatus for an internal combustion engine that can improve the design flexibility in the internal combustion engine.

Solution to Problem

A balancer apparatus for an internal combustion engine according to the present invention includes a first housing including a first bearing portion rotatably supporting a first shaft portion of a balancer shaft, and a second housing including a second bearing portion rotatably supporting a second shaft portion of the balancer shaft.

Advantageous Effects of Invention

Therefore, the present invention can improve the design flexibility in the internal combustion engine.

BRIEF DESCRIPTION OF DRAWINGS

FIG. 20(A) is a side cross-sectional view and FIG. 20(B) is a rear view.

DESCRIPTION OF EMBODIMENTS

First Embodiment

Figure 1:
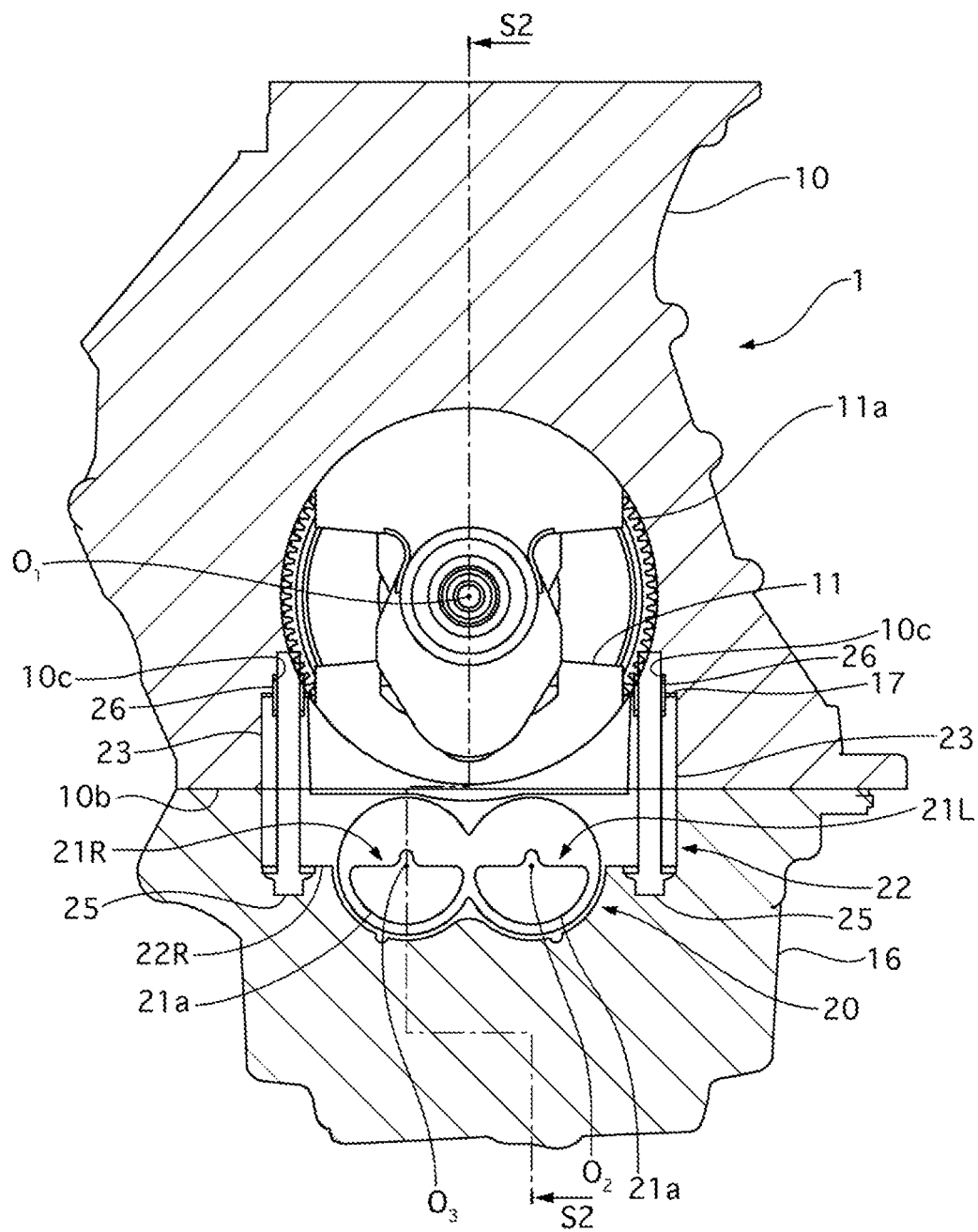
FIG. 1 is a partial cross-sectional view of an engine 1 as viewed from a front side.
Figure 2:
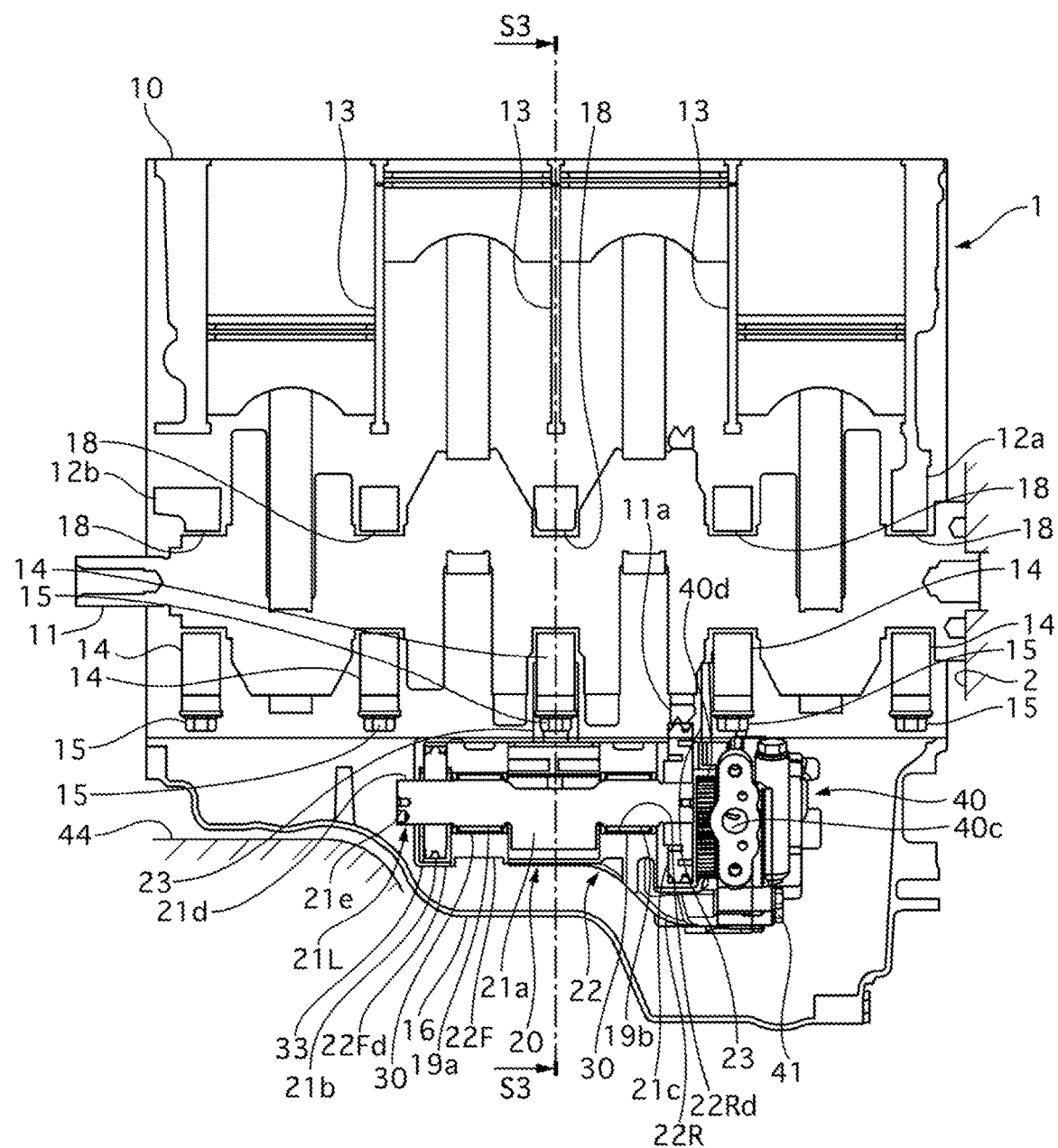
FIG. 2 is a cross-sectional view of the engine 1 taken along a line S2-S2 illustrated in FIG. 1.
Figure 3:
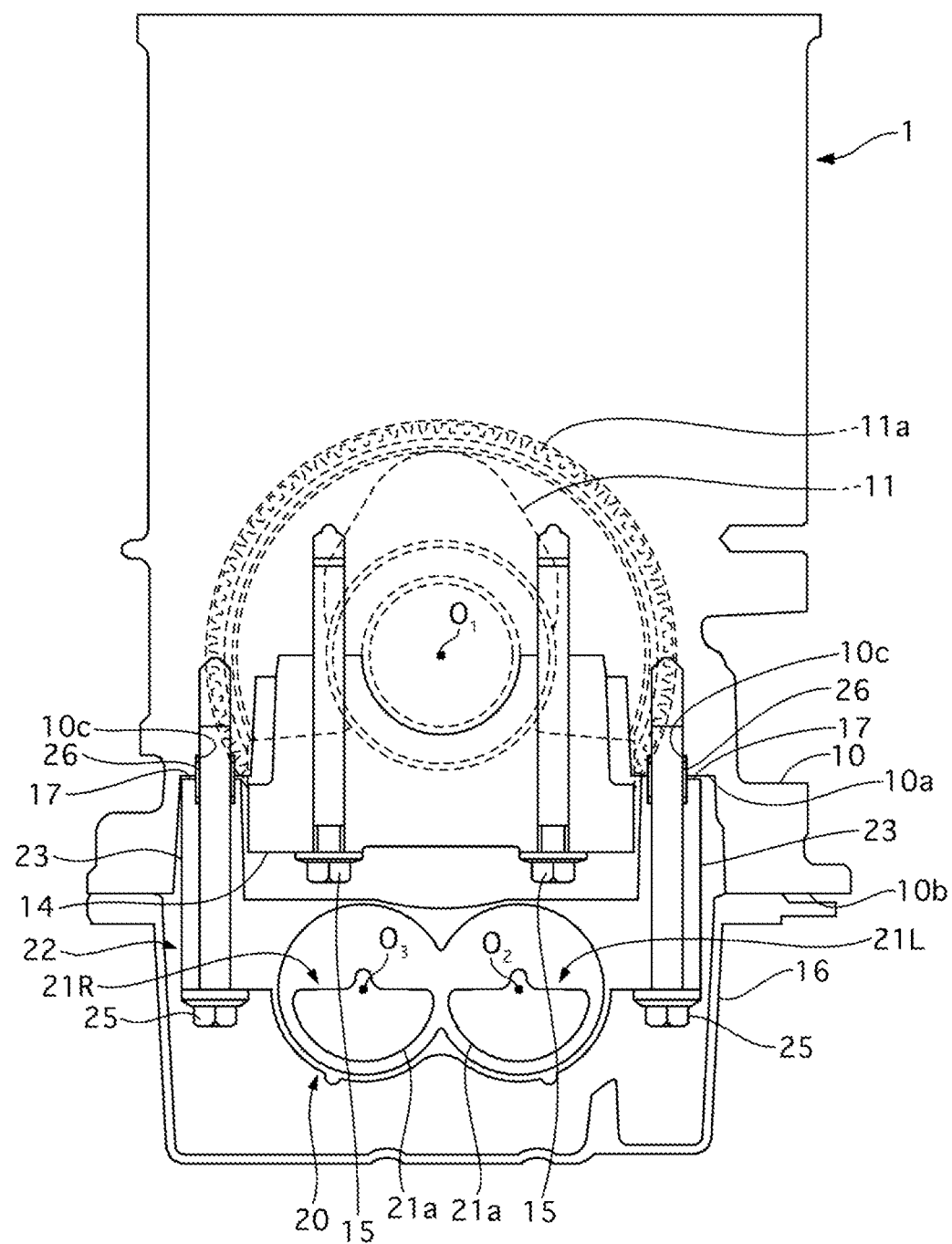
FIG. 3 is a cross-sectional view of the engine 1 taken along a line S3-S3 illustrated in FIG. 2.

FIG. 1 is a partial cross-sectional view of an engine 1 as viewed from a front side. FIG. 2 is a cross-sectional view of the engine 1 taken along a line S2-S2 illustrated in FIG. 1. FIG. 3 is a cross-sectional view of the engine 1 taken along a line S3-S3 illustrated in FIG. 2. The engine (an internal combustion engine) 1 is an in-line four-cylinder gasoline engine, and is mounted on a front-engine rear-drive type vehicle (an FR vehicle). A crankshaft 11 is contained in a cylinder block 10 of the engine 1. The cylinder block 10 is made from, for example, aluminum alloy. A rotational axis line 01 of the crankshaft 11 is arranged along a front-rear direction of the engine 1. A flywheel 2 is attached at a rear end of the crankshaft 11. Side surface vertical wall portions 12*a* and 12*b* are provided at a rear end and a front end of the cylinder block 10, respectively. Three inter-cylinder vertical wall portions 13 are provided at predetermined intervals between both the side surface vertical wall portions 12*a* and 12*b*. A bearing cap 14 is fastened to each of the vertical wall portions 12*a*, 12*b*, and 13 from a lower side of the engine 1 with use of a bolt 15. An upper-side circular-arc portion of a bearing portion 18, which rotatably supports the crankshaft 11, is formed on each of the vertical wall portions 12*a*, 12*b*, and 13. A lower-side circular-arc portion of the bearing portion 18 is formed on each of the bearing caps 14. An oil pan 16, which stores oil therein, is attached at a lower end portion 10b of the cylinder block 10. A balancer apparatus 20 is contained in the oil pan 16.

Figure 4:
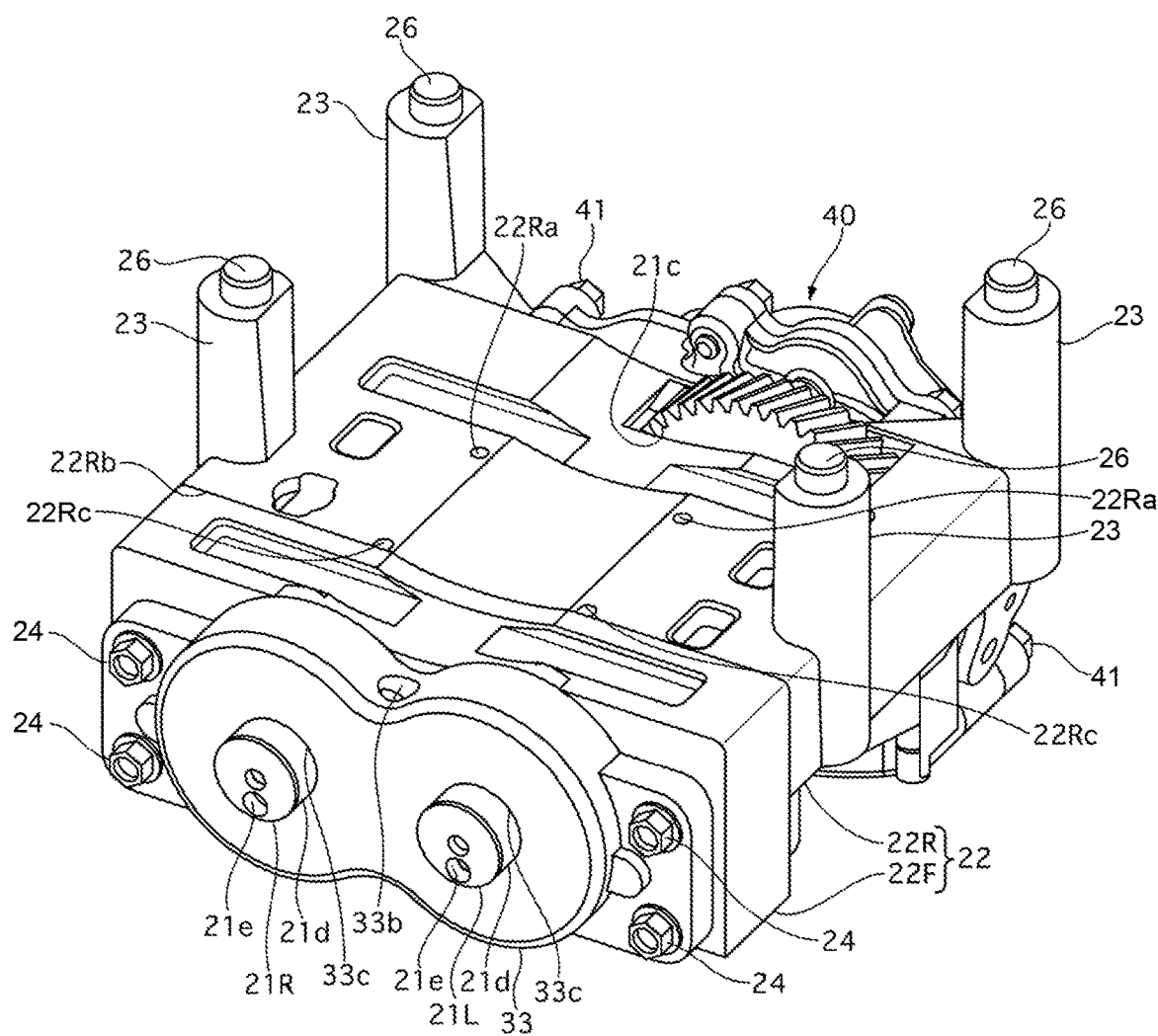
FIG. 4 is a perspective view of a balancer apparatus 20 according to a first embodiment.
Figure 5:
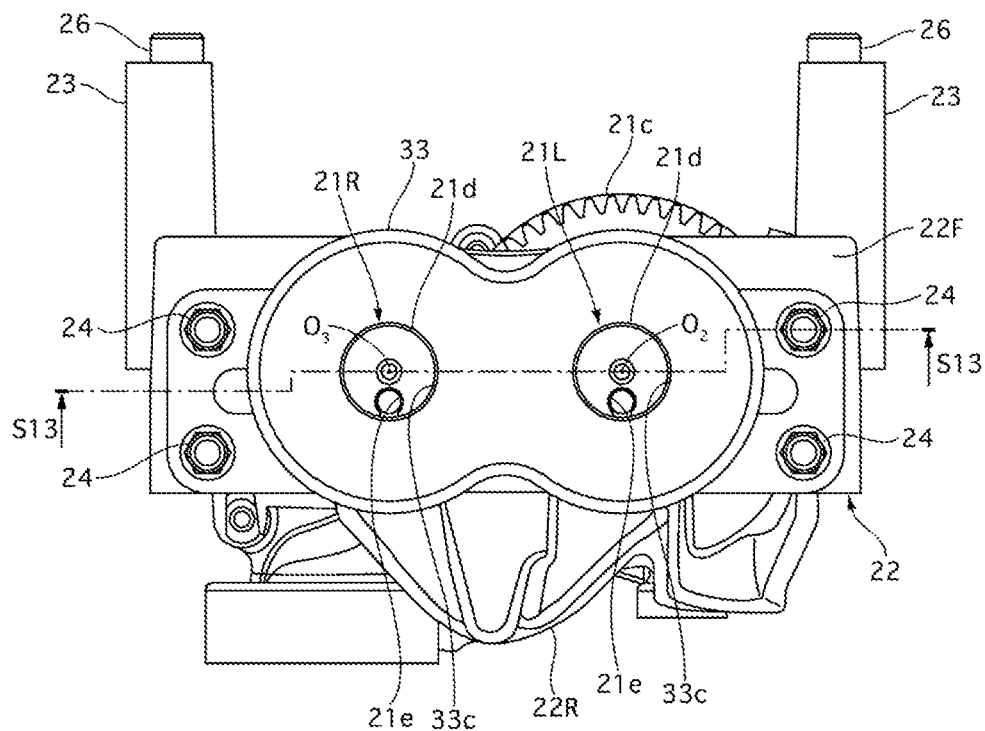
FIG. 5 is a front view of the balancer apparatus 20 according to the first embodiment.
Figure 6:
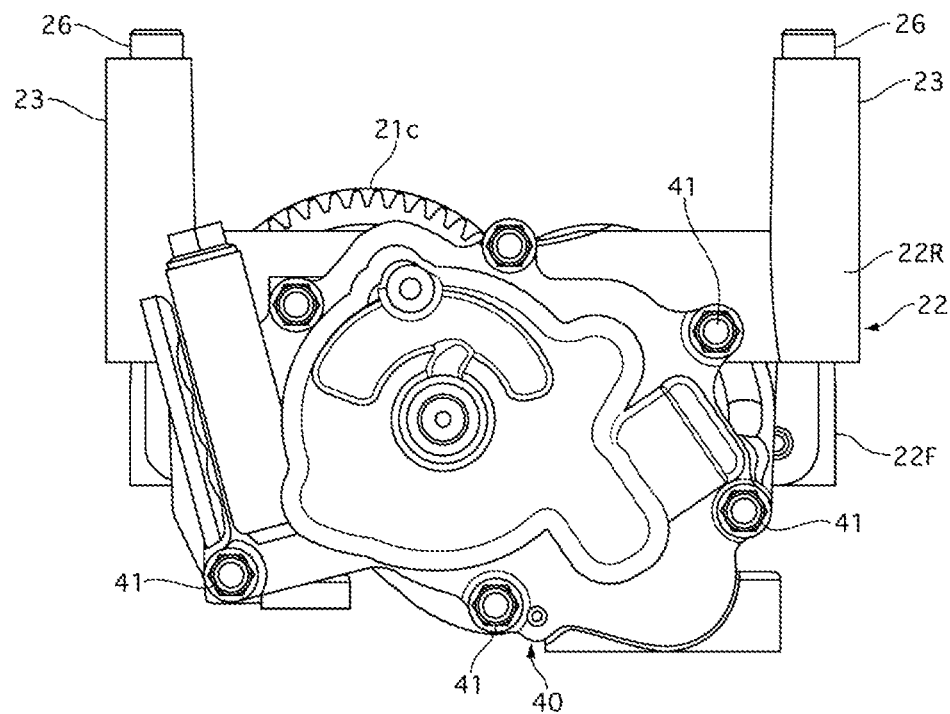
FIG. 6 is a rear view of the balancer apparatus 20 according to the first embodiment.
Figure 7:
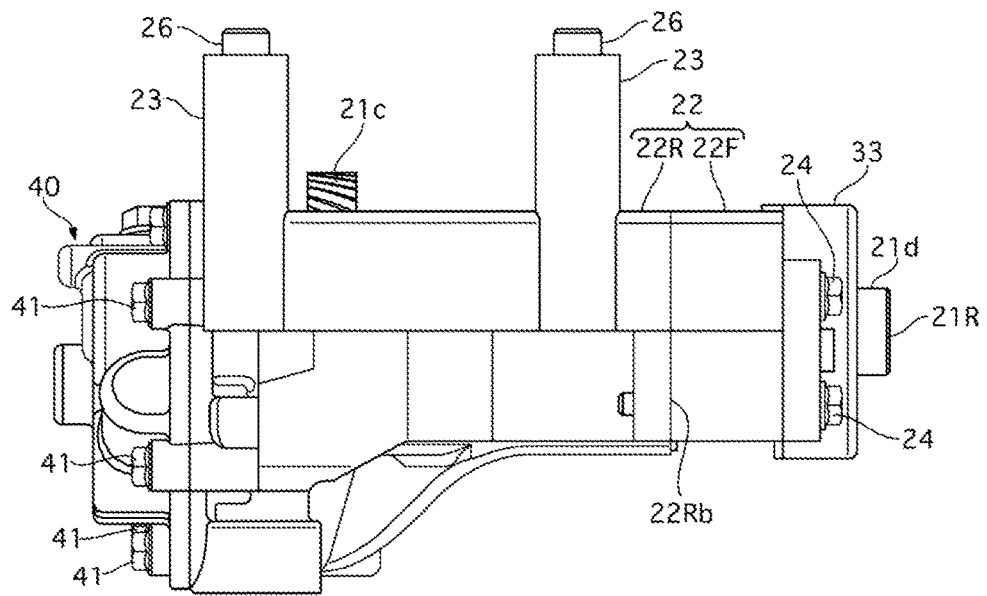
FIG. 7 is a right side view of the balancer apparatus 20 according to the first embodiment.
Figure 8:
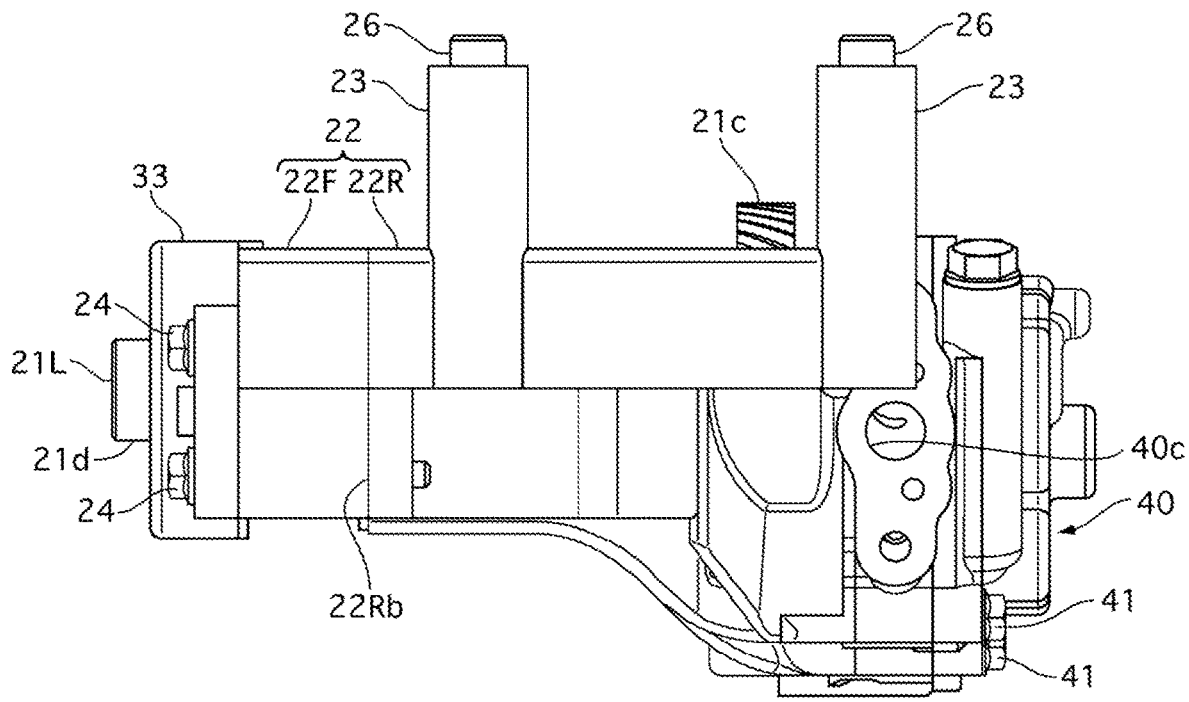
FIG. 8 is a left side view of the balancer apparatus 20 according to the first embodiment.
Figure 9:
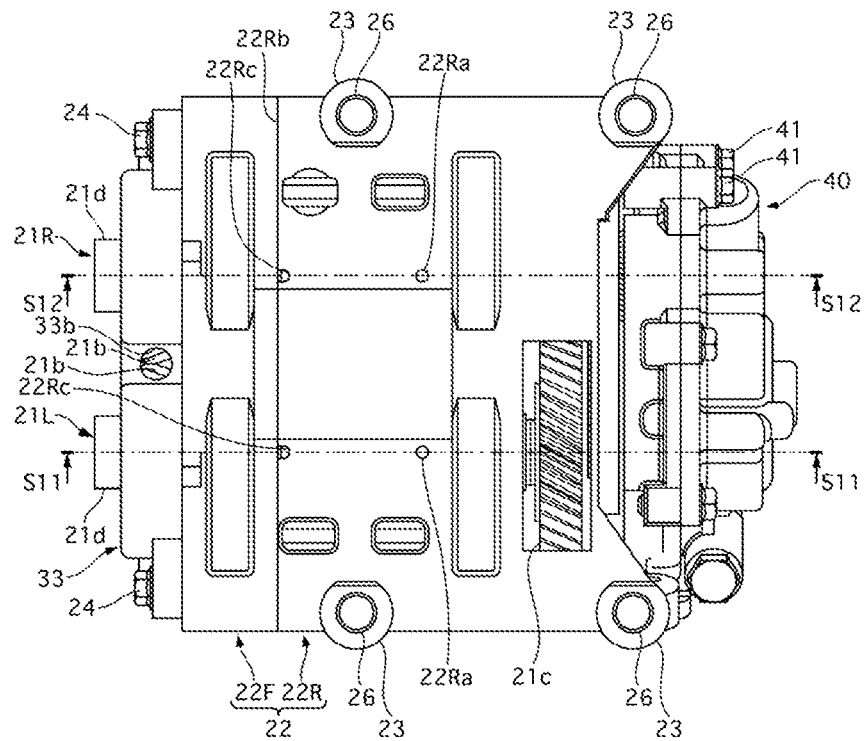
FIG. 9 is a plan view of the balancer apparatus 20 according to the first embodiment.
Figure 10:
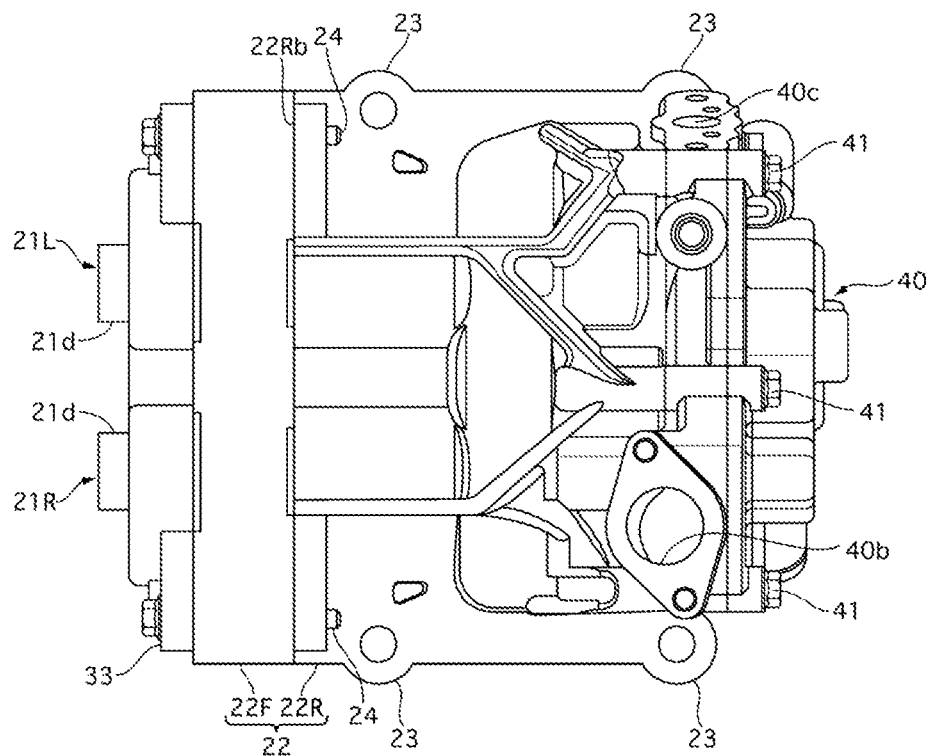
FIG. 10 is a bottom view of the balancer apparatus 20 according to the first embodiment.
Figure 11:
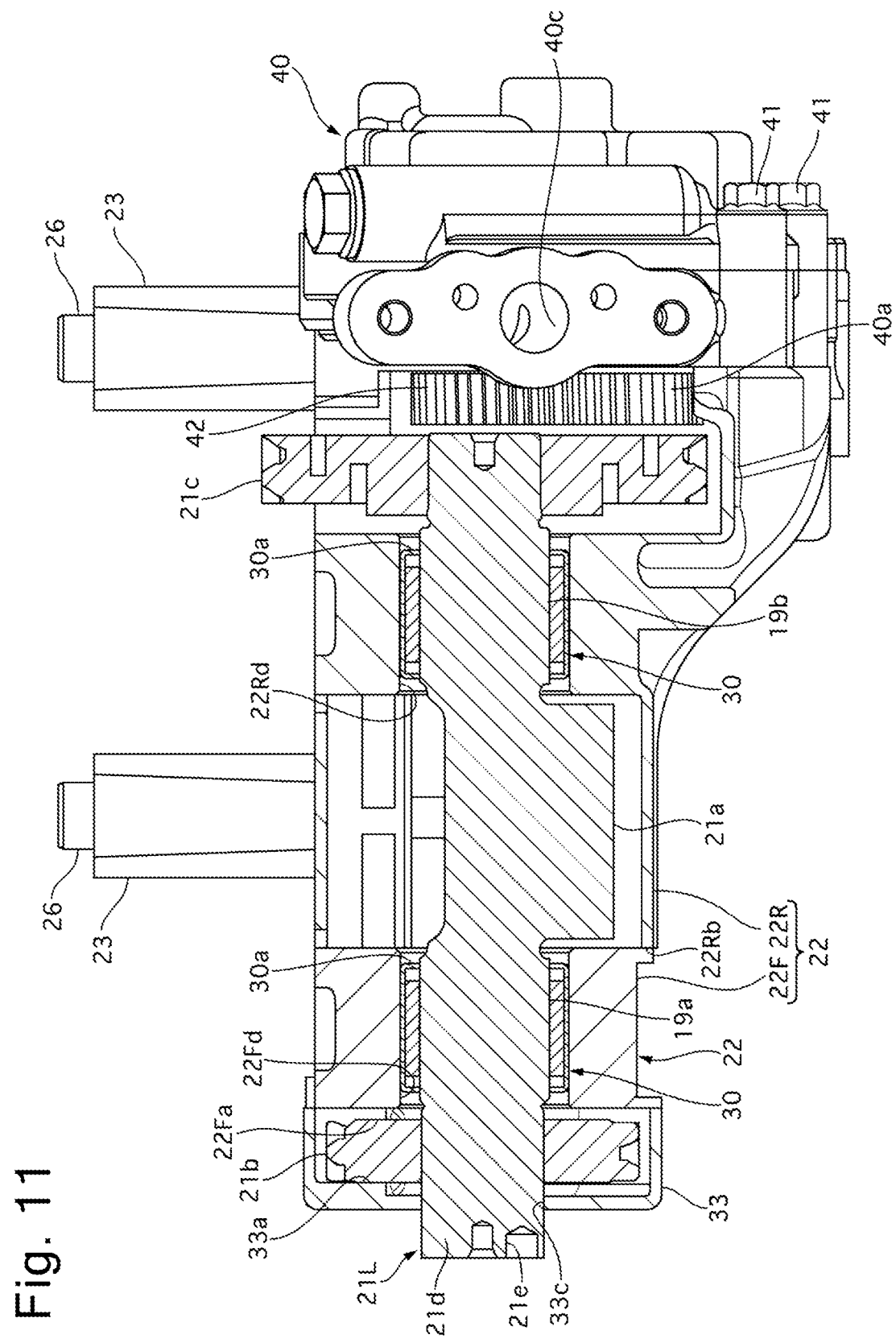
FIG. 11 is a cross-sectional view of the balancer apparatus 20 according to the first embodiment taken along a line S11 to S11 illustrated in FIG. 9.
Figure 12:
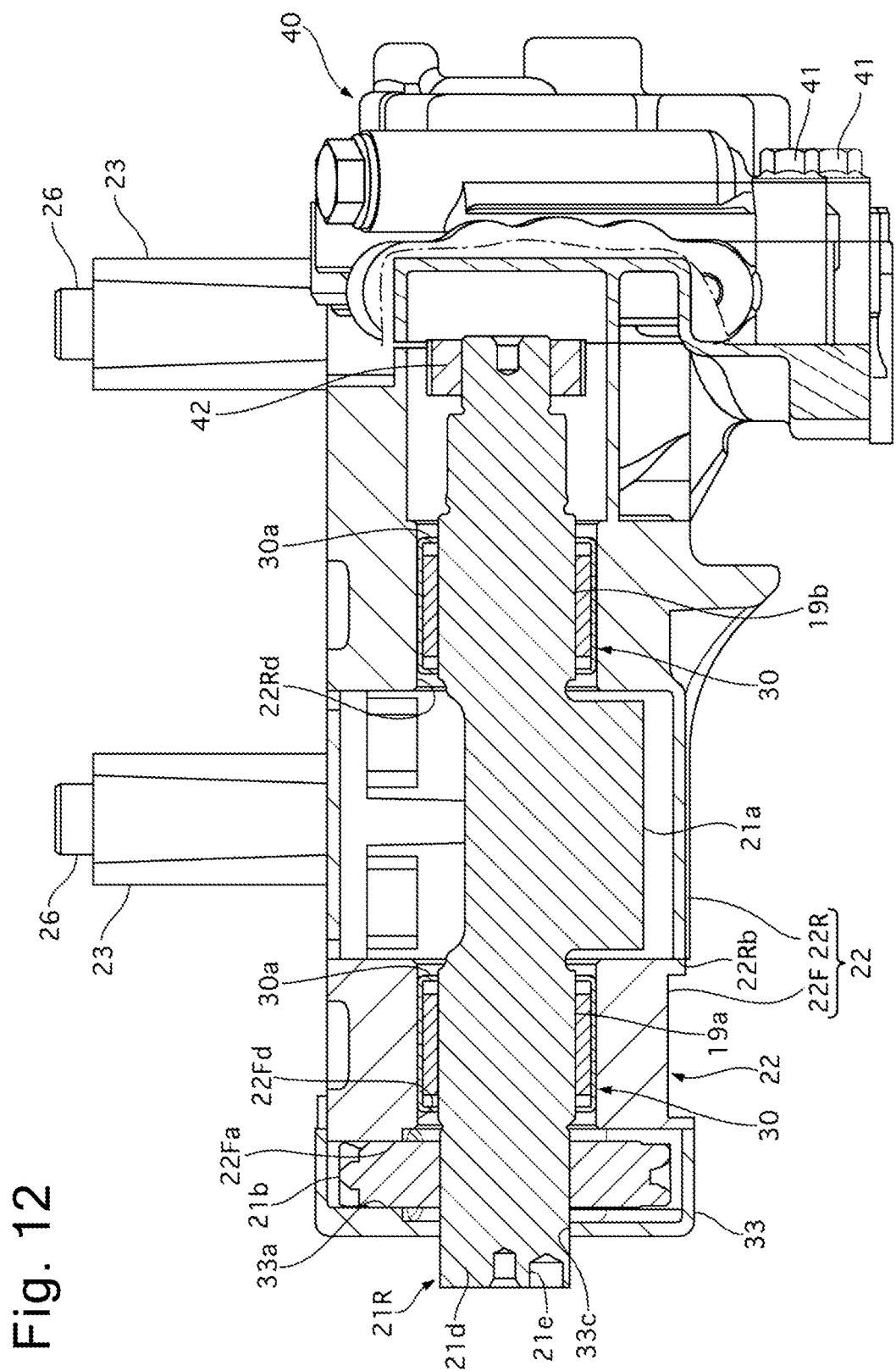
FIG. 12 is a cross-sectional view of the balancer apparatus 20 according to the first embodiment taken along a line S12 to S12 illustrated in FIG. 9.
Figure 13:
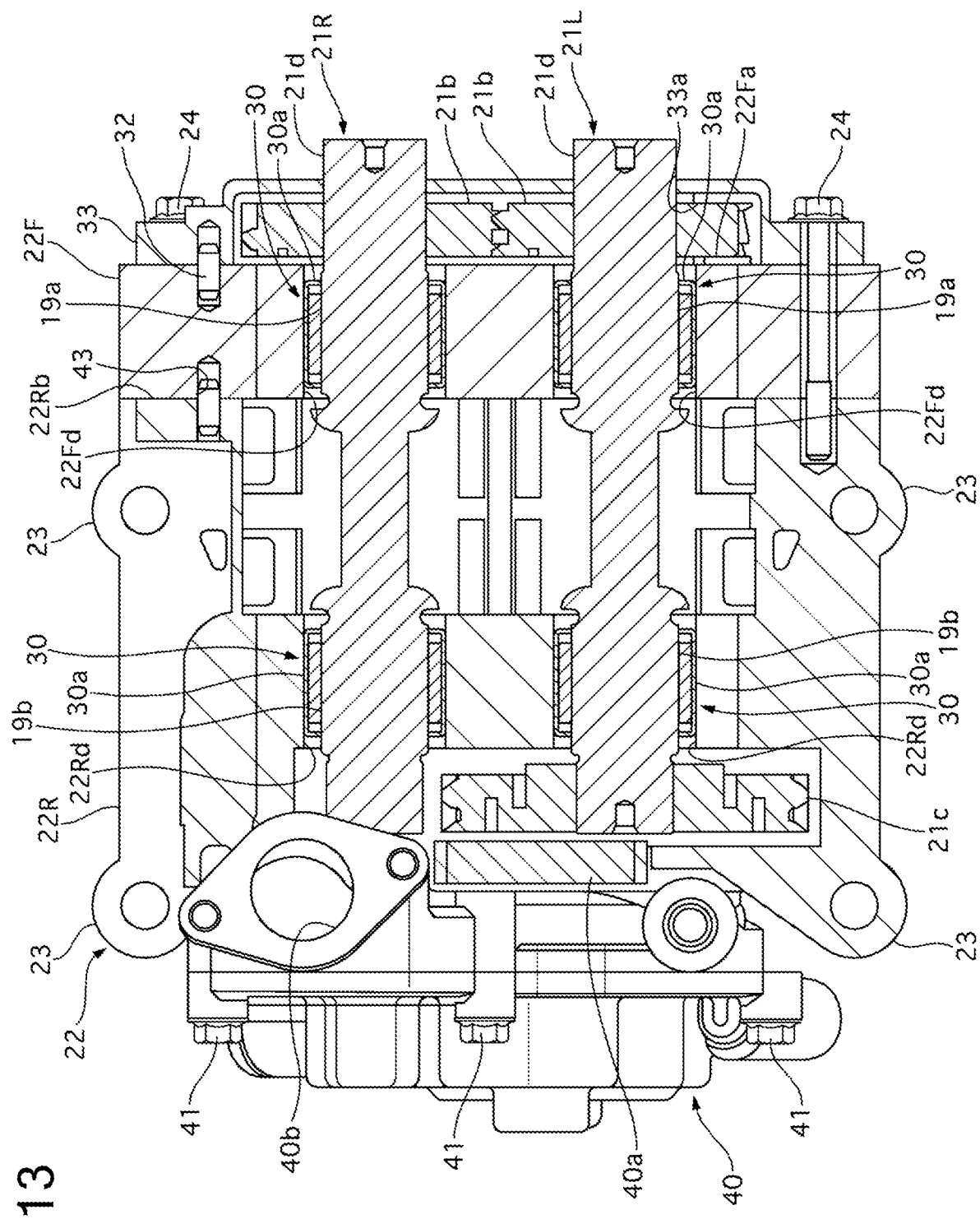
FIG. 13 is a cross-sectional view of the balancer apparatus 20 according to the first embodiment taken along a line S13 to S13 illustrated in FIG. 5.
Figure 14:
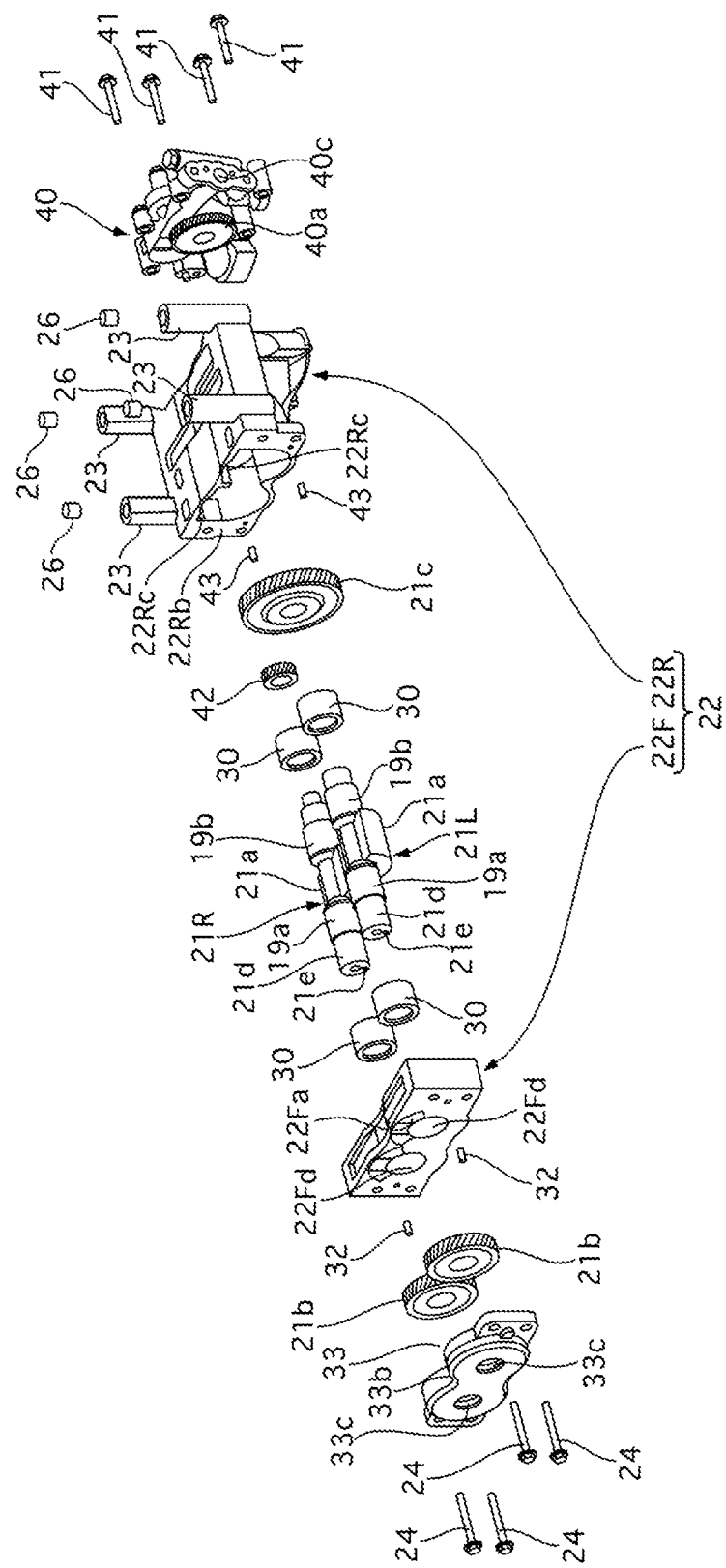
FIG. 14 is an exploded perspective view of the balancer apparatus 20 according to the first embodiment.

FIG. 4 is a perspective view of the balancer apparatus 20 according to the first embodiment. FIG. 5 is a front view of the balancer apparatus 20. FIG. 6 is a rear view of the balancer apparatus 20. FIG. 7 is a right side view of the balancer apparatus 20. FIG. 8 is a left side view of the balancer apparatus 20. FIG. 9 is a plan view of the balancer apparatus 20. FIG. 10 is a bottom view of the balancer apparatus 20. FIG. 11 is a cross-sectional view of the balancer apparatus 20 taken along a line S11 to S11 illustrated in FIG. 9. FIG. 12 is a cross-sectional view of the balancer apparatus 20 taken along a line S12 to S12 illustrated in FIG. 9. FIG. 13 is a cross-sectional view of the balancer apparatus 20 taken along a line S13 to S13 illustrated in FIG. 5. FIG. 14 is an exploded perspective view of the balancer apparatus 20. The balancer apparatus 20 includes left and right balancer shafts 21L and 21R, and a balancer housing 22 rotatably containing the left and right balancer shafts 21L and 21R therein. Four upward extending leg portions 23 are provided on the balancer housing 22. The balancer housing 22 is formed so as to surround an entire circumference of weight portions (balancer weights) 21a of the left and right balancer shafts 21L and 21R.

The balancer housing 22 is formed while being divided in the front-rear direction into a front-side housing (a second housing) 22F and a rear-side housing (a first housing) 22R. The front-side housing 22F is fastened to the rear-side housing 22R together with a gear cover 33 from a front side with use of four bolts 24. In the first embodiment, each of the leg portions 23 is provided on the rear-side housing 22R. An oil hole 33b is formed on a top of the gear cover 33. The oil hole 33b is used to guide oil dropped from inside the engine 1. A hole 33c is formed on the gear cover 33. The hole 33c is used to expose an end portion 21d of each of the left and right balancer shafts 21L and 21R to outside the balancer apparatus 20. The end portion 21d is used as, for example, a portion chucked when a gear backlash or a transmission error is measured, or as a spigot joint. A reference hole 21e is formed at the end portion 21d. A not-illustrated positioning clip is attached in the reference hole 21e when the balancer apparatus 20 is mounted in the cylinder block 10. This configuration regulates rotations of the left and right balancer shafts 21L and 21R, thereby succeeding in preventing the left and right balancer shafts 21L and 21R from rotating due to the force of gravity when the balancer apparatus 20 is mounted in the cylinder block 10 upside down. The positioning clip is removed after the balancer apparatus 20 is mounted in the cylinder block 10.

As illustrated in FIG. 1, the left and right balancer shafts 21L and 21R are disposed in such a manner that rotational axis lines 02 and 03 thereof extend in parallel with the rotational axis line 01 of the crankshaft 11. Further, the rotational axis lines 02 and 03 are arranged horizontally symmetrically in a same horizontal plane with respect to a vertical surface passing through the rotational axis line 01. The weight portion 21a is provided at a generally central position in a rotational axis direction of each of the left and right balancer shafts 21L and 21R. The weight portion 21a is formed integrally with each of the left and right balancer shafts 21L and 21R. The weight portion 21a has a generally semi-cylindrical shape with a weighted center thereof offset from the rotational axis line 02 or 03. As illustrated in FIGS. 11 to 14, in each of the left and right balancer shafts 21L and 21R, a fronts-side shaft portion (a second shaft portion) 19a and a rear-side shaft portion (a first shaft portion) 19b are provided on both sides of the weight portion 21a in the rotational axis direction. The front-side shaft portion 19a and the rear-side shaft portion 19b are rotatably supported on the balancer housing 22 via needle roller bearings (a second bearing (a second roller bearing) and a first bearing (a first roller bearing)) 30, which are roller bearings, respectively. The needle roller bearings 30 include annular outer races 30a. The outer races 30a are press-fitted in bearing holding portions (a second bearing portion (a second fixation hole) and a first bearing portion (a first fixation hole)) 22Fd and 22Rd of the front-side housing 22F and the rear-side housing 22R, respectively. This configuration can prevent the outer races 30a from being dragged due to sliding resistance of the left and right balancer shafts 21L and 21R.

As illustrated in FIG. 13, the front-side housing 22F and the rear-side housing 22R are positioned relative to each other with use of a positioning solid pin 43. This configuration can prevent an axial offset between the needle roller bearing 30 press-fitted in the bearing holding portion 22Fd and the needle roller bearing 30 press-fitted in the bearing holding portion 22Rd. Further, the front-side housing 22F and the gear cover 33 are also positioned relative to each other with use of a similar positioning solid pin 32. This configuration can reduce a clearance between the end portion 21d of each of the left and right balancer shafts 21L and 21R and the hole 33c of the gear cover 33, thereby preventing or reducing entry of the oil into the gear cover 33.

As illustrated in FIGS. 4 and 9, two oil holes 22Ra are formed on a top of the rear-side housing 22R. The oil holes 22Ra are located adjacent to the bearing holding portion 22Rd, and provided above the left and right balancer shafts 21L and 21R. Two oil grooves 22Rc are formed on a mating surface 22Rb of the rear-side housing 22R with the front-side housing 22F. The oil grooves 22Rc are located adjacent to the bearing holding portions 22Fd, and provided above the left and right balancer shafts 21L and 21R. The oil dropped from inside the engine 1 is introduced into the balancer housing 22 via the oil holes 22Ra and the oil grooves 22Rc.

Both the weight portions 21a are constantly located at the same heights as each other during the rotations of the left and right balancer shafts 21L and 21R. A pair of interlocking gears 21b and 21b meshed with each other is provided at the front end portions of the left and right balancer shafts 21L and 21R. The pair of interlocking gears 21b and 21b is interposed between a thrust portion 33a of the gear cover 33 and a thrust portion 22Fa of the front-side housing 22F with a predetermined clearance formed therebetween. This configuration regulates displacements of the pair of interlocking gears 21b and 21b in the rotational axis direction. Further, a driven gear (a driven portion) 21c is provided on the left balancer shaft 21L. The driven gear 21c is meshed with a driving gear 11a fixed to the crankshaft 11. This configuration allows the left and right balancer shafts 21L and 21R to be rotationally driven in synchronization with the crankshaft 11. A speed ratio between the driving gear 11a and the driven gear 21c is 2, and the left and right balancer shafts 21L and 21R rotate at a speed twice the crankshaft 11.

An oil pump 40 is fastened to the rear-side housing 22R of the balancer housing 22 with use of bolts 41. As illustrated in FIGS. 11 to 14, an oil pump driven gear 40a of the oil pump 40 is meshed with a pinion gear 42 provided at the rear end portion of the right balancer shaft 21R. This configuration allows the oil pump 40 to be rotationally driven in synchronization with the left and right balancer shafts 21L and 21R. The oil pump 40 discharges the oil introduced from an intake port 40*b* via a not-illustrated oil strainer from a discharge port 40*c*. The discharged oil is supplied to the cylinder block 10 by passing through a not-illustrated communication pipe.

As illustrated in FIG. 4, the leg portions 23 are provided so as to extend upward from four corners on the front, rear, left, and right sides of the rear-side housing 22R, respectively. As illustrated in FIG. 3, each of the leg portions 23 is fastened to a bottom surface 10*a* of the cylinder block 10 via a shim 17 from below with use of a housing attachment bolt 25. The balancer housing 22 is attached to the bottom surface 10*a* of the cylinder block 10 so as to extend over the crankshaft 11 and the bearing cap 14. At this time, the balancer housing 22 protrudes downward from the lower end portion 10*b* of the cylinder block 10, and the left and right balancer shafts 21L and 21R are located in the oil pan 16. A positioning hollow pin 26 protrudes upward at an upper end of each of the leg portions 23. The positioning hollow pin 26 is press-fitted in the leg portion 23. Attachment holes 10*c* are provided on the bottom surface 10*a* of the cylinder block 10. The attachment holes 10*c* are fitted to the positioning hollow pins 26, respectively. Each of the attachment holes 10*c* is disposed close to the bearing portion 18 of the crankshaft 11. In other words, each of the attachment holes 10*c* is located at sides of each of the inter-cylinder vertical wall portions 13 and each of the bearing caps 14. The housing attachment bolt 25 is inserted in each of the positioning hollow pins 26. The housing attachment bolt 25 is tightened in a screw hole of the cylinder block 10 that is continuous from the attachment hole 10*c* in a state fitted in the attachment hole 10*c* corresponding to each of the positioning hollow pins 26. Each of the attachment holes 10*c* is disposed close to the bearing portion 18, which bring the crankshaft 11 and the bearing portion 18 into a state surrounded by the balancer housing 22, each of the leg portions 23, and the bottom surface 10*a* of the cylinder block 10.

Prevention or Reduction of Secondary Vibration of Engine

In the balancer apparatus 20 according to the first embodiment, when the engine 1 is activated and the crankshaft 11 is rotationally driven, the left and right balancer shafts 21L and 21R rotate at the speed twice the crankshaft 11 via the driving gear 11*a* and the driven gear 21*c*. The right balancer shaft 21R rotates in an opposite direction from the left balancer shaft 21L at the same speed through a meshed rotation transition between the pair of interlocking gears 21*b* and 21*b*. By this operation, both the weight portions 21*a* and 21*a* also rotate in opposite directions from each other while canceling left and right centrifugal forces of the left and right balancer shafts 21L and 21R themselves. In this manner, both the weight portions 21*a* and 21*a* rotate according to the rotations of the left and right balancer shafts 21L and 21R to transmit a vibratory force to the engine 1, by which a secondary vibration of the engine 1 can be prevented or reduced.

Improvement of Design Flexibility

In the balancer apparatus 20 according to the first embodiment, the balancer housing 22 containing the left and right balancer shafts 21L and 21R therein is formed while being divided into the front-side housing 22F and the rear-side housing 22R. The bearing holding portions 22Fd and 22Fd, which surround outer peripheries of the front-side bearing portions 19*a* and 19*a* of the left and right balancer shafts 21L and 21R and rotationally support the front-side bearing portions 19*a* and 19*a,* are provided on the front-side housing 22F. On the other hand, the bearing holding portions 22Rd and 22Rd, which surround outer peripheries of the rear-side bearing portions 19*a* and 19*a* of the left and right balancer shafts 21L and 21R and rotationally support the rear-side bearing portions 19*a* and 19*a,* are provided on the rear-side housing 22R. In other words, the bearing holding portions 22Fd and 22Fd and the bearing holding portions 22Rd and 22Rd are provided on the different housings. This configuration allows the left and right balancer shafts 21L and 21R to be mounted in the balancer housing 22 without outermost diameter portions (the weight portions 21*a* and 21*a*) of the left and right balancer shafts 21L and 21R inserted in the bearing holding portions 22Fd and 22Fd or the bearing holding portions 22Rd and 22Rd. Therefore, the outermost diameter portions (the weight portions 21*a* and 21*a*) of the left and right balancer shafts 21L and 21R and inner diameters of the bearing holding portions 22Fd and 22Rd can be set independently of each other. Accordingly, the balancer apparatus 20 can secure a required unbalance amount while preventing or cutting down increases in axial dimensions of the left and right balancer shafts 21L and 21R. As a result, the balancer apparatus 20 can reduce constraints on a layout with other components, thereby improving a design flexibility in the engine.

Then, the engine 1 according to the first embodiment is mounted on the FR vehicle. Generally, in the FR vehicle, the front-rear direction of the engine 1, i.e., the rotational axis direction of the crankshaft 11 is arranged along a front-rear direction of the vehicle. Therefore, as illustrated in FIG. 2, a power steering unit 44 will be disposed directly below the front-side portion of the cylinder block 10. Therefore, a layout space in the oil pan 16 is limited to a narrow area in the front-rear direction of the engine. The balancer apparatus 20 according to the first embodiment can reduce the dimension in the front-rear direction of the engine, and therefore is especially preferable as the balancer apparatus of the engine mounted on the FR vehicle.

Reduction in Friction

As described above, in the balancer apparatus 20 according to the first embodiment, the inner diameters of the bearing holding portions 22Fd and 22Fd and the bearing holding portions 22Rd and 22Rd can be set independently of the outermost diameters of the left and right balancer shafts 21L and 21R. In other words, outer diameters of the needle roller bearings 30 fixed to the bearing holding portions 22Fd and 22Fd can be set to smaller diameters than the outermost diameters of the left and right balancer shafts 21L and 21R. Now, as the needle roller bearing increases in diameter, an amount of remaining oil increases, and therefore stirring resistance of the oil increases. On the other hand, in the first embodiment, the stirring resistance of the oil can reduce due to the reduction in the diameter of the needle roller bearing 30, which contributes to realization of a low friction. Then, the oil remaining in the needle roller bearing has high viscosity when the engine is started under an environment at an extremely low temperature, which raises a concern with an increase in an engine start torque accompanying a high friction. Therefore, the reduction in the diameter of the needle roller bearing 30 is significantly effective in preventing or cutting down the increase in the engine start torque under the environment at the extremely low temperature.

Improvement of Rigidity of Driving Force Transmission Portion

In the first embodiment, each of the leg portions 23, which are used to attach the balancer housing 22 to the bottom surface 10a of the cylinder block 10, is disposed on the rear-side housing 22R containing the driven gear 21c therein. This configuration can enhance rigidity of the rear-side housing 22R, which receives the driving force from the crankshaft 11 as the balancer apparatus 20. Therefore, the balancer apparatus 20 can prevent or reduce a separation and an approach between the driving gear 11a and the driven gear 21c. As a result, the balancer apparatus 20 can reduce rattling noise accompanying the separation between the driving gear 11a and the driven gear 21c. Further, the balancer apparatus 20 can prevent or reduce interference noise on a tooth surface accompanying the approach between the driving gear 11a and the driven gear 21c.

Securement of High Adhesive Force of Roller Bearing

In the first embodiment, the needle roller bearings 30 are fixed by being press-fitted in the bearing holding portion 22Fd provided on the front-side housing 22F and the bearing holding portion 22Rd provided on the rear-side housing 22R, respectively. The front-side housing 22F and the rear-side housing 22R are the two members divided in the rotational axis direction of the left and right balancer shafts 21L and 21R, and are assembled by tightening the bolts 24 in the rotational axis direction of the left and right balancer shafts 21L and 21R.

In the following description, as a comparative example with the first embodiment, suppose that the roller bearings are mounted on a vertically divided balancer housing, which is divided into two members in a vertical direction (a direction orthogonal to the axis of the balancer shaft), i.e., divided into an upper-side housing and a lower-side housing. In this case, the two bearing holding portions fixing the roller bearings each have a vertically divided shape divided in half. Each of the roller bearings is fixed between an upper-side bearing holding portion and a lower-side bearing holding portion by fastening the upper-side housing and the lower-side housing with use of a bolt. Then, the outer peripheral surface of the outer race of the roller bearing should adhere to the inner peripheral surface of the bearing holding portion to prevent creeping (the drag due to the sliding resistance of the balancer shaft). Therefore, when the roller bearing is fixed to the bearing holding portion, tight fit is employed with a tightening margin provided to a fitting surface. Further, the upper-side bearing holding portion and the lower-side bearing holding portion are subjected to simultaneous machining because they should be processed with high dimensional accuracy. More specifically, the upper-side bearing holding portion and the lower-side bearing holding portion are formed by boring a boundary between both the housings with use of a boring machine with the upper-side housing and the lower-side housing fastened with use of a bolt and a positioning pin set to "correct". After the simultaneous machining, both the housings are dissembled, cleaned, and are fastened in the vertical direction with use of the bolt with the balancer shafts, the roller bearings, and the individual gears mounted thereon at the time of final assembling of the balancer apparatus.

If there is a large variation between an axial force when both the housings are fastened with use of the bolt at the time of the simultaneous machining, and an axial force when both the housings are fastened with use of the bolt at the time of the final assembling, the roller bearing is deformed at the time of the assembling. More specifically, if the axial force at the time of the assembling is weaker than the axial force at the time of the simultaneous machining, the outer race of the roller bearing is enlarged in diameter. On the other hand, if the axial force at the time of the assembling is greater than the axial force at the time of the simultaneous machining, the outer race of the roller bearing is extended radially inwardly. In other words, the variation between the axial force at the time of the simultaneous machining and the axial force at the time of the assembling leads to a reduction in circularity of the roller bearing. The reduction in the circularity of the roller bearing causes the creeping to easily occur, thereby raising concern with occurrence of abnormal heat generation, and generation of abrasion powder and abnormal noise.

Then, one conceivable method to achieve stable management of the axial force is to carry out torque control tightening (a torque management method) until both the housings adhere to each other (until a bolt head is seated), and carry out angle control tightening (an angle management method) after the adhesion is established. In the torque control tightening, the bolt is tightened until this tightening reaches a preset snug torque. In the angle control tightening, the bolt is further tightened by a set angle based on a tightening angle of the bolt when the tightening reaches the snug torque. Especially, carrying out the torque control tightening in an elastic region of the bolt and carrying out the angle control tightening in a plastic region of the bolt allows the axial force to be further stably managed. However, the vertically divided balancer housing makes the stable management of the axial force difficult because of a large variation in the snug torque due to an influence of the tightening margin of the fitting surface. In this manner, the vertically divided balancer housing makes it impossible to stably acquire a high adhesive force since the adhesive force of the roller bearing relies on the tightening force of the bolt.

On the other hand, in the balancer apparatus 20 according to the first embodiment, the outer periphery of the needle roller bearing 30 on the front-side shaft portion 19a side of each of the left and right balancer shafts 21L and 21R is fixed to the front-side housing 22F while being surrounded by the bearing holding portion 22Fd. In other words, the outer race 30a of the needle roller bearing 30 is surrounded only by the bearing holding portion (the bearing holding portion 22Fd or the bearing holding portion 22Rd) of one housing (the front-side housing 22F or the rear-side housing 22R). Then, the needle roller bearing 30 is fixed by being press-fitted in one bearing holding portion (the bearing holding portion 22Fd or the bearing holding portion 22Rd). In other words, the adhesive force of the needle roller bearing 30 to the bearing holding portion 22Fd or 22Rd does not rely on the tightening force of the bolt 24 fastening the front-side housing 22F and the rear-side housing 22R to each other but relies on only the tightening margin at the time of the press-fitting. As a result, the balancer apparatus 20 can allow the outer peripheral surface of the outer race 30a to securely adhere to the inner peripheral surface of the bearing holding portion 22Fd or 22Rd, thereby stably acquiring a high adhesive force of the needle roller bearing 30.

The first embodiment brings about the following advantageous effects.

(1) The balancer apparatus 20 includes the left and right balancer shafts 21L and 21R each including the balancer weight 21a and the rear-side shaft portion 19b and the front-side shaft portion 19a provided on the both sides of the weight portion 21a in the rotational axis direction, the rear-side housing 22R including the bearing holding portion 22Rd surrounding the outer periphery of the rear-side shaft portion 19b and rotatably supporting the rear-side shaft portion 19b, and the front-side housing 22F including the bearing holding portion 22Fd rotatably supporting the front-side shaft portion 19a.

Therefore, the balancer apparatus 20 can improve the design flexibility in the engine.

(2) The outermost diameter of each the left and right balancer shafts 21L and 21R is larger than the inner diameter of the bearing holding portion 22Rd.

Therefore, the balancer apparatus 20 can secure the required unbalance amount while preventing or cutting down the increases in the axial dimensions of the left and right balancer shafts 21L and 21R, thereby reducing the constraints on the layout with the other components and improving the design flexibility in the engine.

(3) Each of the left and right balancer shafts 21L and 21R, and the weight portion 21a are integrally molded.

Therefore, even when the weight portion 21a is integrally molded on each of the left and right balancer shafts 21L and 21R, the balancer apparatus 20 allows the outer diameter of the weight portion 21a and the inner diameter of the bearing holding portion 22Rd to be set independently of each other, thereby improving the design flexibility.

(4) The rear-side housing 22R and the front-side housing 22F are assembled in the rotational axis direction of the left and right balancer shafts 21L and 21R.

Therefore, the balancer apparatus 20 allows all the components including the other components to be mounted from the rotational axis direction of the left and right balancer shafts 21L and 21R, thereby succeeding in improving assemblability.

(5) The first bearing and the second bearing are fixed in the bearing holding portion 22Rd and the bearing holding portion 22Fd, respectively.

Therefore, since the first bearing and the second bearing are fixed by being press-fitted in the bearing holding portions 22Fd and 22Rd, respectively, the balancer apparatus 20 can acquire the high adhesive forces of the first bearing and the second bearing.

(6) At least one of the first bearing and the second bearing is the needle roller bearing 30.

Therefore, the balancer apparatus 20 can realize the low friction due to the needle roller bearing 30. Further, since the needle roller bearing 30 is fixed by being press-fitted in the bearing holding portion 22Fd or the bearing holding portion 22Rd, the balancer apparatus 20 can acquire the high adhesive force of the needle roller bearing 30.

(7) Both the first bearing and the second bearing are each the needle roller bearing 30.

Therefore, the balancer apparatus 20 can realize the low friction due to the needle roller bearings 30. Further, since the needle roller bearings 30 are fixed by being press-fitted in the bearing holding portions 22Fd and 22Rd, respectively, the balancer apparatus 20 can acquire the high adhesive forces of the needle roller bearings 30.

(8) The balancer apparatus 20 includes the driven gear 21c configured in such a manner that the rotational force is transmitted from the crankshaft 11 thereto, and the left and right balancer shafts 21L and 21R to which the driven gear 21c is attached. The left and right balancer shafts 21L and 21R each include the weight portion 21a, and the rear-side shaft portion 19b and the front-side shaft portion 19a provided on the both sides of the weight portion 21a in the rotational axis direction. The balancer apparatus 20 further includes the rear-side housing 22R attached to the engine 1 (the cylinder block 10 thereof) and including the bearing holding portion 22Rd rotatably supporting the rear-side shaft portion 19b, and the front-side housing 22F fixed to the rear-side housing 22R and including the bearing holding portion 22Fd rotatably supporting the front-side shaft portion 19a.

Therefore, the balancer apparatus 20 can improve the design flexibility in the engine. Further, the balancer apparatus 20 can improve the rigidity of the rear-side housing 22R receiving the driving force from the crankshaft 11.

(9) The rear-side housing 22R is mounted in the engine 1 (the cylinder block 10 thereof) and is also coupled with the left balancer shaft 21L, and supports the driven gear 21c to which the rotational force is transmitted from the crankshaft 11.

Therefore, the balancer apparatus 20 can improve the rigidity of the rear-side housing 22R receiving the driving force from the crankshaft 11.

(10) The two or more leg portions 23 are provided on each of the both side portions of the rear-side housing 22R in the rotational axis direction of the left and right balancer shafts 21L and 21R. The leg portions 23 are used for the fixation to the engine 1.

Therefore, the balancer apparatus 20 can improve the rigidity of the rear-side housing 22R receiving the driving force from the crankshaft 11.

(11) The balancer apparatus 20 includes the left and right balancer shafts 21L and 21R each including the weight portion 21a and the rear-side shaft portion 19a and the front-side shaft portion 19a provided on the both sides of the weight portion 21a in the rotational axis direction, the needle roller bearing 30 provided at the rear-side shaft portion 19b and rotatably supporting each of the left and right balancer shafts 21L and 21R, the needle roller bearing 30 provided at the front-side shaft portion 19a and rotatably supporting each of the left and right balancer shafts 21L and 21R, the rear-side housing 22R including the bearing holding portion 22Rd fixedly surrounding the outer periphery of the needle roller bearing 30, and the front-side housing 22F including the bearing holding portion 22Fd fixedly surrounding the outer periphery of the needle roller bearing 30.

Therefore, the balancer apparatus 20 can improve the design flexibility in the engine. Further, the balancer apparatus 20 can realize the low friction due to the needle roller bearings 30. Further, since the needle roller bearings 30 are fixed by being press-fitted in the bearing holding portions 22Fd and 22Rd, respectively, the balancer apparatus 20 can acquire the high adhesive forces of the needle roller bearings 30 and 30.

Second Embodiment

Figure 15:
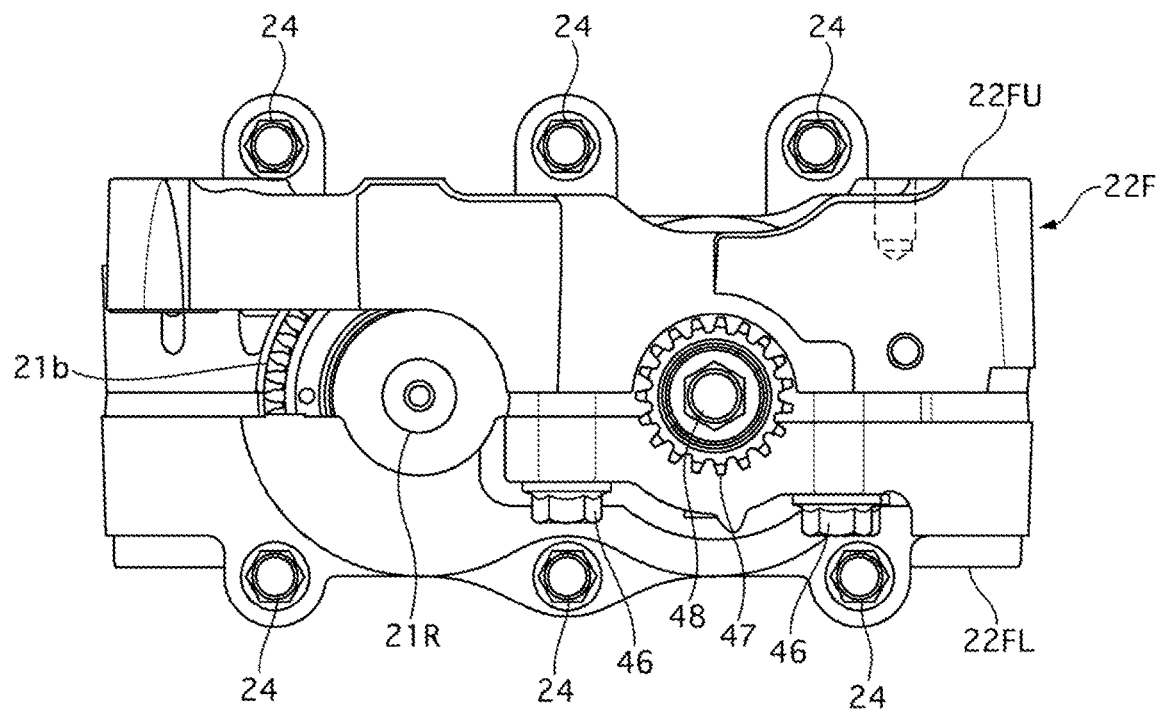
FIG. 15 is a front view of a balancer apparatus 20 according to a second embodiment.
Figure 16:
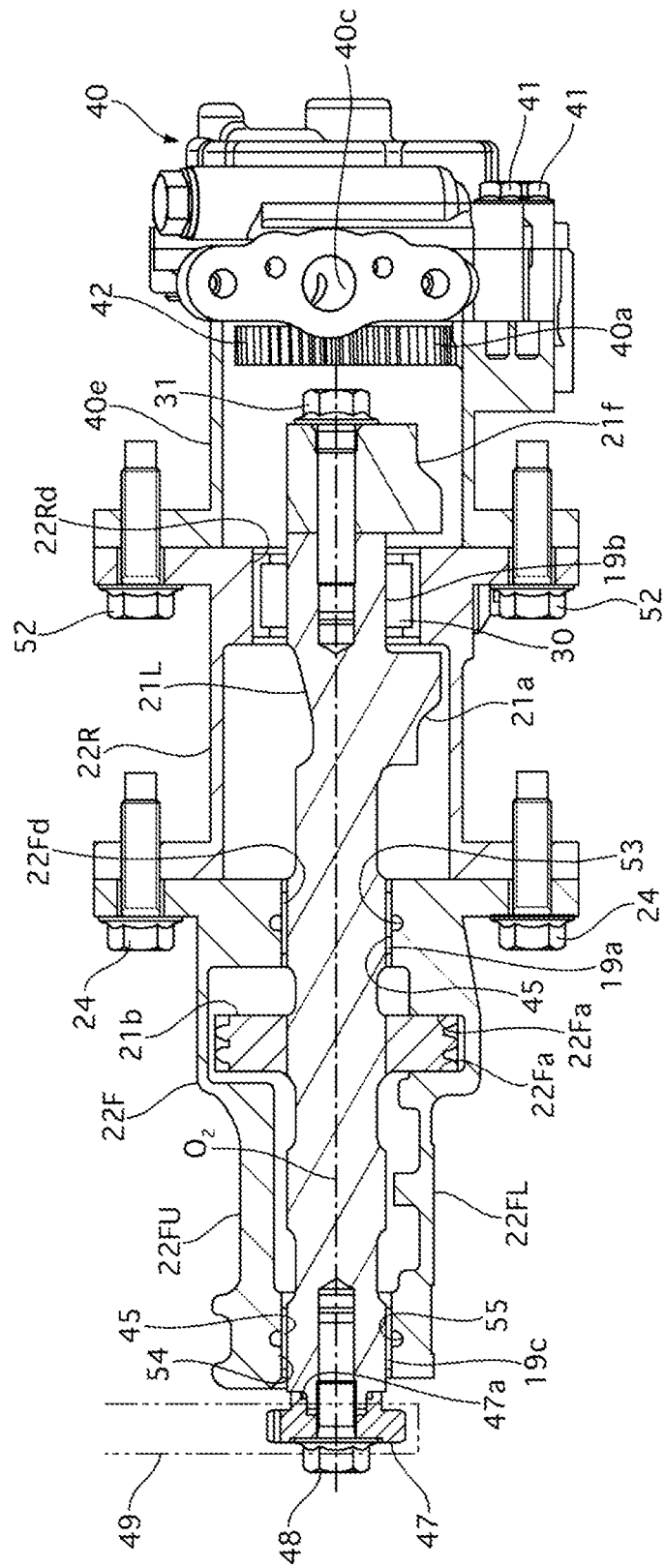
FIG. 16 is a cross-sectional view of the balancer apparatus 20 according to the second embodiment taken along the line S11 to S11 illustrated in FIG. 9.

Next, a second embodiment will be described. A basic configuration of the second embodiment is similar to the first embodiment, and therefore only differences will be described. FIG. 15 is a front view of a balancer apparatus 20 according to the second embodiment. FIG. 16 is a cross-sectional view of the balancer apparatus 20 according to the second embodiment taken along the line S11-S11 illustrated in FIG. 9. A second weight (cantilever balancer weight) 21f is fixed at the rear end of each of the left and right balancer shafts 21L and 21R according to the second embodiment. The second weight 21f is fastened from the rotational axis direction of the left and right balancer shafts 21L and 21R with use of a bolt 31 in a state in phase with the weight portion 21a with use of a not-illustrated tool. The second weight 21f is covered by a cover portion 40e provided so as to extend from the oil pump 40. This configuration can prevent or reduce the increase in the driving force due to the stirring of the oil and entry of air into the oil (aeration). The cover portion 40e is fastened to the rear-side housing 22R from a front side thereof with use of a plurality of bolts 52.

The front-side shaft portion 19a of each of the left and right balancer shafts 21L and 21R is supported rotatably relative to the bearing holding portion 22Fd of the front-side housing 22F via a plane bearing 45, which is a sliding bearing divided vertically in half. An annular oil groove 53 is formed on the front-side bearing portion 19a. A part of the oil discharged from the oil pump 40 is supplied into the oil groove 53 via an oil passage (not illustrated) formed in the balancer housing 22. The rear-side bearing portion 19b of each of the left and right balancer shafts 21L and 21R is supported rotatably relative to the bearing holding portion 22Rd of the rear-side housing 22R via the needle roller bearing 30.

The front-side housing 22F is formed while being divided in the vertical direction into an upper-side member 22FU and a lower-side member 22FL. The upper-side member 22FU and the lower-side member 22FL are fastened to each other from a lower side with use of a bolt 46. In the second embodiment, the balancer apparatus 20 does not include the gear cover 33 containing the pair of interlocking gears 21b and 21b therein, so that thrust portions 22Fa are each provided on the lower-side member 22FL while facing each other. The pair of interlocking gears 21b and 21b is interposed between both the thrust portions 22Fa and 22Fa with a predetermined clearance formed therebetween.

The front end of the left balancer shaft 21L is provided so as to extend in the rotational axis direction as far as the front end of the engine 1. A third bearing portion 19c is provided at the front end portion of the left balancer shaft 21L. The third bearing portion 19c is rotatably supported on the front-side housing 22F via the plane bearing 45, which is the sliding bearing divided vertically in half. The plane bearing 45 is press-fitted in a bearing holding portion 54 provided at the front end of the front-side housing 22F. An annular oil groove 55 is formed at the bearing holding portion 54. A part of the oil discharged from the oil pump 40 is supplied into the oil groove 55 via an oil passage (not illustrated) formed in the balancer housing 22. A portion of each of the left and right balancer shafts 21L and 21R that is located on the front side with respect to the front-side shaft portion 19a is formed so as to have a smaller diameter than the outer diameter of the front-side shaft portion 19a.

A sprocket 47 is fastened to the front end of the left balancer shaft 21L with use of a bolt 48 in a state positioned by a spigot joint 47a. An annular transmission member 49, such as a chain and a belt, is wound around the sprocket 47. The sprocket 47 is pulled toward the crankshaft 11 side by tensing a not-illustrated tension.

The upper-side member 22FU and the lower-side member 22FL are fastened to the rear-side housing 22R from the front side with use of three bolts 24 for each of them. In the second embodiment, four leg portions 23 are provided on the upper-side member 22FU and two leg portions 23 are provided on the rear-side housing 22R, although this is not illustrated. The four leg portions 23 provided on the upper-side member 22FU are provided so as to extend upward from four corners on front, rear, left, and right sides of the upper-side member 22FU. The balancer apparatus 20 can effectively receive a tensile load of the annular transmission member 49 by the two leg portions 23 on the front-side housing 22F disposed adjacent to the sprocket 47, thereby securing rigidity against the tensile load. The two leg portions 23 provided on the rear-side housing 22R are provided so as to extend upward from positions located at the left and right ends of the rear-side housing 22R and the same positons as the rear-side shaft portions 19b in the rotational axis direction of the left and right balancer shafts 21L and 21R. The balancer apparatus 20 effectively receives the centrifugal forces of the left and right balancer shafts 21L and 21R by the two leg portions 23 disposed on the rear-side housing 22R. The two leg portions 23 on the rear side among the four leg portions 23 provided on the upper-side member 22FU are disposed at generally intermediate positions between the other four leg portions 23 in a length direction of the balancer housing 22. This configuration allows the balancer apparatus 20 to effectively compensate for a reduction in the rigidity at a portion where the front-side housing 22F and the rear-side housing 22R are coupled with each other with the mating surface 22Rb.

The second embodiment brings about the following advantageous effects.

(12) The first bearing is the needle roller bearing 30. The second weight 21f supported only by the first bearing is provided on the opposite side of the first bearing from the weight portion 21a in the rotational axis direction of the left and right balancer shafts 21L and 21R.

Therefore, the balancer apparatus 20 can prevent or reduce an uneven contact of the needle roller bearing 30, thereby allowing the needle roller bearing 30 to be used under as far as load rating fully. In other words, the balancer apparatus 20 can allow the needle roller bearing 30 to exert 100 percent of its performance.

(13) The second bearing is the plane bearing 45.

Therefore, by using the sliding bearing as the second bearing supposed to be subjected to a lighter load than the first bearing, the balancer apparatus 20 can be constructed at lower cost compared to the use of the roller bearing as the second bearing.

(14) The front-side housing 22F is divided in the direction orthogonal to the axis of the left and right balancer shafts 21L and 21R.

Therefore, this configuration allows the balancer apparatus 20 to employ the conventional sliding bearing divided into the two pieces in the direction orthogonal to the axis of the left and right balancer shafts 21L and 21R.

(15) The second weight 21f is fixed from the rotational axis direction of the left and right balancer shafts 21L and 21R.

Therefore, the balancer apparatus 20 allows all the components including the other components except for the front-side housing 22F (the upper-side member 22FU and the lower-side member 22Fl) to be mounted from the rotational axis direction of the left and right balancer shafts 21L and 21R, thereby succeeding in improving the assemblability.

Third Embodiment

Figure 17:
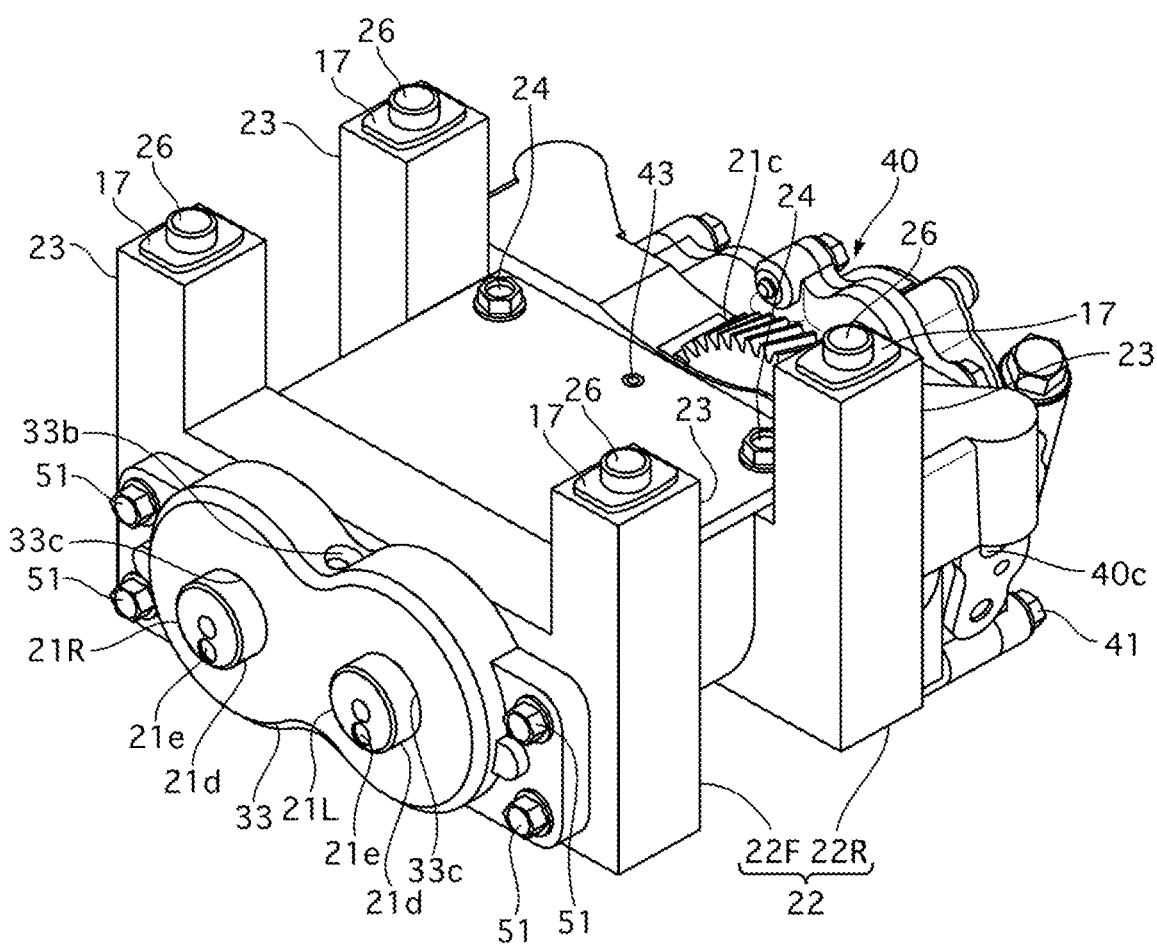
FIG. 17 is a perspective view of a balancer apparatus 20 according to a third embodiment.
Figure 18:
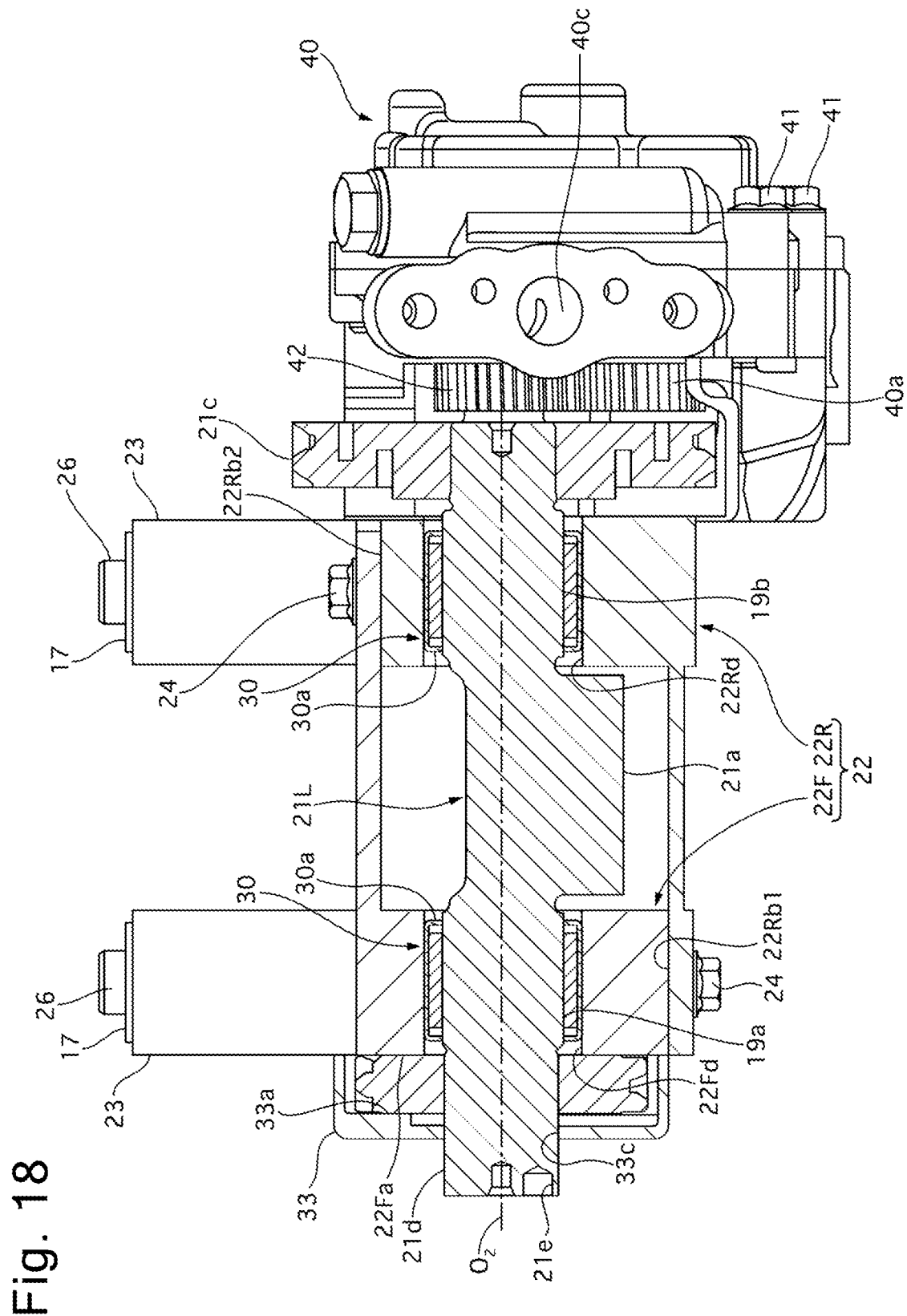
FIG. 18 is a cross-sectional view of the balancer apparatus 20 according to the third embodiment taken along the line S11 to S11 illustrated in FIG. 9.
Figure 19:
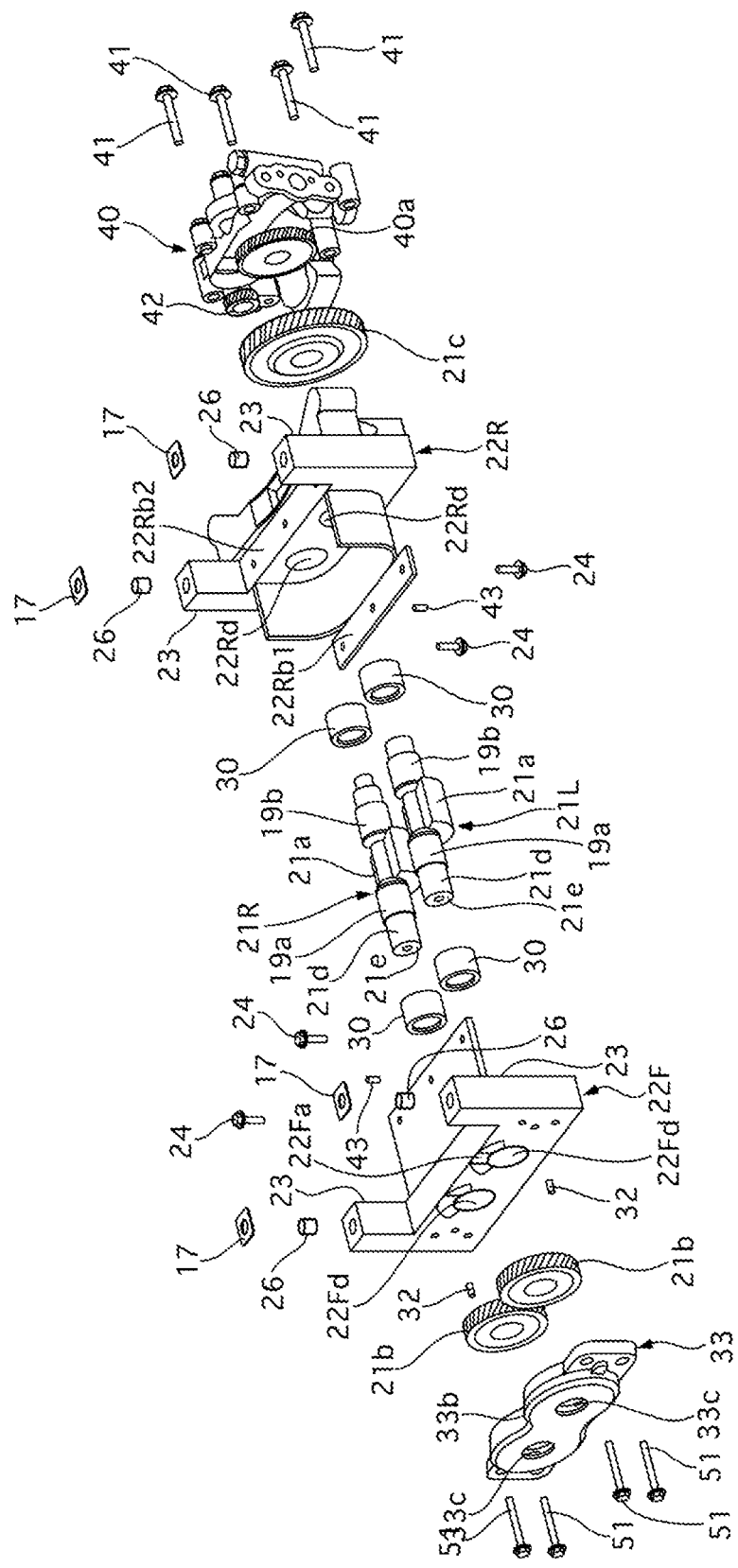
FIG. 19 is an exploded perspective view of the balancer apparatus according to the third embodiment.

Next, a third embodiment will be described. A basic configuration of the third embodiment is similar to the first embodiment, and therefore only differences will be described. FIG. 17 is a perspective view of a balancer apparatus 20 according to the third embodiment. FIG. 18 is a cross-sectional view of the balancer apparatus 20 according to the third embodiment taken along the line S11-S11 illustrated in FIG. 9. FIG. 19 is an exploded perspective view of the balancer apparatus 20 according to the third embodiment. In the third embodiment, the rear-side housing 22R includes two mating surfaces 22Rb1 and 22Rb2 between the rear-side housing 22R and the front-side housing 22F. Both the mating surfaces 22Rb1 and 22Rb2 extend in parallel with a plane containing the rotational axis lines 02 and 03 of the left and right balancer shafts 21L and 21R. The front-side mating surface 22Rb1 is provided below the bearing holding portion 22Fd. The rear-side mating surface 22Rb2 is provided above the bearing holding portion 22Rd. The front-side housing 22F and the rear-side housing 22R are fastened with use of two bolts 24 from the lower side in a state positioned at a position of the front-side mating surface 22Rb1 with use of a positioning solid pin 43. Further, the front-side housing 22F and the rear-side housing 22R are fastened from the upper side with use of two bolts 24 in a state positioned at a position of the rear-side mating surface 22Rb2 with use of a positioning solid pin 43. The gear cover 33 is fastened to the front-side housing 22F with use of four bolts 51. Two leg portions 23 are provided on each of the front-side housing 22F and the rear-side housing 22R while being separated on the left side and the right side. In the third embodiment, a direction in which the bolt 24 fastening the front-side housing 22F and the rear-side housing 22R is tightened is set to the vertical direction of the balancer apparatus 20. This configuration allows the bolt 24 to be inserted into the bolt hole with the aid of a weight of the bolt 24 itself while the balancer apparatus 20 is in a stable state laid on the side thereof without being placed upright. Therefore, the bolt 24 can be easily tightened even with use of a vertical nut runner.

The third embodiment brings about the following advantageous effects.

(16) The rear-side housing 22R and the front-side housing 22F are assembled in the direction orthogonal to the axis of the left and right balancer shafts 21L and 21R.

Therefore, the balancer apparatus 20 can be assembled in the stable state laid on the side thereof, thereby improving the assemblability.

Fourth Embodiment

Next, a fourth embodiment will be described. A basic configuration of the fourth embodiment is similar to the second embodiment, and therefore only differences will be described. The fourth embodiment is different from the second embodiment in terms of the upper-side member 22FU and the lower-side member 22FL integrally molded, and a rolled bush employed instead of the plane bearing 45. The rolled bush is formed by rolling a flat plate into a generally cylindrical shape. The rolled bush is fixed by being press-fitted into the bearing holding portion 22Fd from the axial direction of the left and right balancer shafts 21L and 21R. The employment of the rolled bush as the sliding bearing allows the upper-side member 22FU and the lower-side member 22FL to be integrally molded and the number of components to be reduced compared to the second embodiment. Further, the rolled bush is available at lower cost than the plane bearing divided vertically in half, and therefore the cost can be reduced compared to the second embodiment.

The fourth embodiment brings about the following advantageous effects.

(17) The sliding bearing is the rolled bush.

Therefore, the front-side housing 22F can be integrally molded.

Other Embodiments

Having described embodiments for implementing the present invention based on the exemplary embodiments thereof, the specific configuration of the present invention is not limited to the configurations indicated in the exemplary embodiments, and the present invention also includes a design modification and the like thereof made within a range that does not depart from the spirit of the present invention.

For example, in the first embodiment, the position of the mating surface 22Rb of the rear-side housing 22R with the front-side housing 22F is placed at the position adjacent to the bearing holding portion 22Fd of the front-side housing 22F, but may be placed at a position adjacent to the bearing holding portion 22Rd of the rear-side housing 22R. Alternatively, the mating surface 22Rb may be displaced toward the driven gear 21c side, which will be described below, in the form of extending an abutment portion of the front-side housing 22F with the mating surface 22Rb of the rear-side housing 22R. In this case, the oil groove 22Rc is assumed to have a hole shape similarly to the oil hole 22Ra.

In the second embodiment, the front-side housing 22F of the balancer housing 22 is divided vertically into the two members, and the plane bearing 45 divided vertically in half is used. However, the bearing of the sprocket 47 is subjected to only a load in a tensile direction of the annular transmission member 49, and therefore can also be replaced with a needle roller bearing divided vertically in half.

Figure 20:
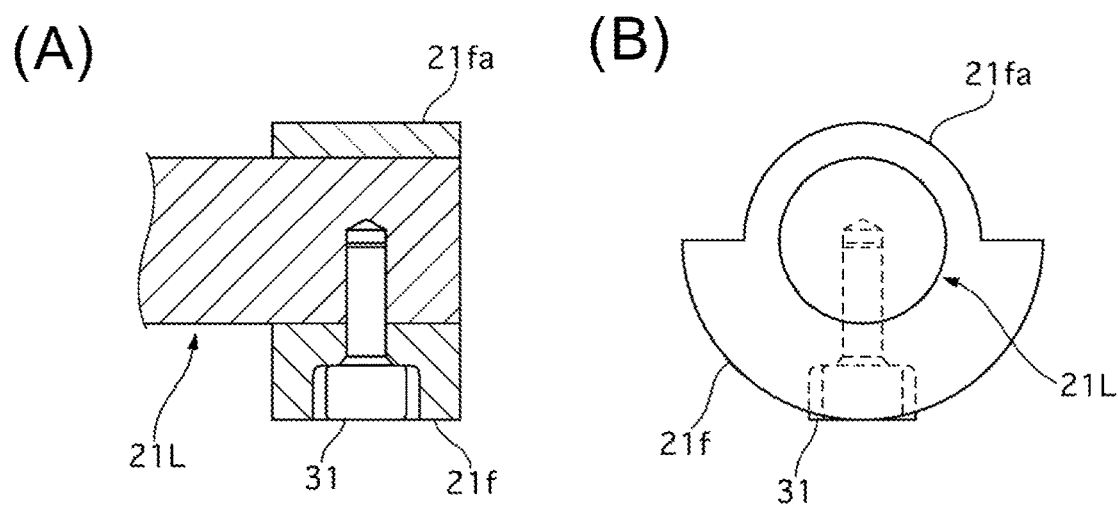
FIGS. 20(A) and 20(B) illustrate a modification of a method for fixing a second weight 21*f,* and, in particular.

In the second embodiment, the second weight 21f is fastened with use of the bolt 31 from the rotational axis direction of the left and right balancer shafts 21L and 21R, but the method for fixing the second weight 21f to the left and right balancer shafts 21L and 21R may be any method. For example, as illustrated in FIGS. 20(A) and 20(B), the second weight 21f may be fastened with use of the bolt 31 from a radial direction of the left and right balancer shafts 21L and 21R. In this case, a suspended portion 21fa may be provided to reduce the axial force on the bolt 31. Further, the second weight 21f may be fixed to the rear end of the left and right balancer shaft 21L or 21R by welding, gluing, or press-fitting instead of the fixation using the bolt 31.

The invention set forth in the claims recognizable from the embodiments may be configured in the following manner.

(a) In the balancer apparatus for the internal combustion engine described in (7), both the first bearing and the second bearing are each the roller bearing.

Therefore, the balancer apparatus can realize the low friction due to the roller bearing. Further, since the roller bearing is press-fitted in the bearing portion, the balancer apparatus can acquire the high adhesiveness of the roller bearing.

(b) In the balancer apparatus for the internal combustion engine described in (7), the first bearing is the roller bearing. The cantilever balancer weight supported only by the first bearing is provided on the opposite side of the balancer shaft from the balancer weight in the rotational axis direction of the balancer shaft relative to the first bearing.

Therefore, the balancer apparatus can prevent or reduce the uneven contact of the roller bearing, thereby allowing the roller bearing to be used under as far as the load rating fully. In other words, the balancer apparatus can allow the roller bearing to exert 100 percent of its performance.

(c) In the balancer apparatus for the internal combustion engine described in (b), the second bearing is the sliding bearing.

Therefore, by using the sliding bearing as the second bearing supposed to be subjected to a lighter load than the first bearing, the balancer apparatus can be constructed at lower cost compared to the use of the roller bearing as the second bearing.

(d) In the balancer apparatus for the internal combustion engine described in (c), the second housing is divided in the direction orthogonal to the axis of the balancer shaft.

Therefore, this configuration allows the balancer apparatus to employ the conventional sliding bearing divided into the two pieces in the direction orthogonal to the axis of the balancer shaft.

(e) In the balancer apparatus for the internal combustion engine described in (c), the sliding bearing is the rolled bush.

Therefore, the second housing can be integrally molded.

(f) In the balancer apparatus for the internal combustion engine described in (b), the cantilever balancer weight is fixed from the rotational axis direction of the balancer shaft.

Therefore, the balancer apparatus allows all the components including the other components except for the second housing to be mounted from the rotational axis direction of the balancer shaft, thereby succeeding in improving the assemblability.

(g) In the balancer apparatus for the internal combustion engine described in (1), the first housing is mounted in the internal combustion engine and is also coupled with the balancer shaft, and supports the driven portion to which the rotational force is transmitted from the crankshaft.

Therefore, the balancer apparatus can improve the rigidity of the first housing receiving the driving force from the crankshaft.

(h) In the balancer apparatus for the internal combustion engine described in (8), the two or more leg portions are provided on each of both the side portions of the first housing in the rotational axis direction of the balancer shaft. The leg portions are used for the fixation to the internal combustion engine.

Therefore, the balancer apparatus can improve the rigidity of the first housing receiving the driving force from the crankshaft.

Having described merely several embodiments of the present invention, those skilled in the art will be able to easily appreciate that the embodiments described as the examples can be modified or improved in various manners without substantially departing from the novel teachings and advantages of the present invention. Therefore, such modified or improved embodiments are intended to be also contained in the technical scope of the present invention. The above-described embodiments may also be arbitrarily combined.

The present application claims priority under the Paris Convention to Japanese Patent Application No. 2015-108046 filed on May 28, 2015. The entire disclosure of Japanese Patent Application No. 2015-108046 filed on May 28, 2015 including the specification, the claims, the drawings, and the abstract is incorporated herein by reference in its entirety.

REFERENCE SIGN LIST

1 engine (internal combustion engine)
11 crankshaft
19*a* front-side shaft portion (second shaft portion)
19*b* rear-side shaft portion (first shaft portion)
20 balancer apparatus
21L left balancer shaft
21R right balancer shaft
21*a* weight portion (balancer weight)
21*c* driven gear (driven portion)
21*f* second weight (cantilever balancer weight)
22 balancer housing
22F front-side housing (second housing)
22Fd bearing holding portion (second bearing portion, second fixation hole)
22R rear-side housing (first housing)
22Rd bearing holding portion (first bearing portion, first fixation hole)
30 needle roller bearing (first bearing, second bearing, first roller bearing, second roller bearing)
45 plane bearing (second bearing, sliding bearing)

The invention claimed is:

1. A balancer apparatus for an internal combustion engine, the balancer apparatus comprising:
    a housing rotatably containing a balancer shaft, the housing comprising a first housing and a second housing divided in a rotational axis direction of the balancer shaft;
    the first housing comprising a first housing body portion, a first bearing portion, a first fixing portion, and a second fixing portion;
    the first housing body portion comprising a single block, the first bearing portion being provided in the first housing body portion;
    the first and second fixing portions being located on an outside of the first housing body portion and being spaced apart from each other in the rotational axis direction and being connectable to the internal combustion engine;
    the second housing comprising a second housing body portion and a second bearing portion;
    the second bearing portion being provided in the second housing body portion;
    a first bearing provided in the first bearing portion;
    a second bearing provided in the second bearing portion;
    the balancer shaft comprising a first shaft portion, a balancer weight, and a second shaft portion arranged in order of the first shaft portion, the balancer weight and the second shaft portion from one of a pair of ends of the balancer shaft;
    the balancer shaft being mounted in the housing;
    the first shaft portion being supported by the first bearing;
    the second shaft portion being supported by the second bearing;
    the balancer weight being larger in a radial direction with respect to the rotational axis direction of the balancer shaft than an inner diameter of each of the first bearing portion and the second bearing portion; and
    a driven portion provided on the balancer shaft and configured to be acted on by a driving force from a crankshaft of the internal combustion engine, the driven portion being located between the first fixing portion and the second fixing portion, the first and second fixing portions being arranged along the rotational axis direction, the driven portion being exposed from the first housing body portion.

2. The balancer apparatus for the internal combustion engine according to claim 1, wherein the balancer shaft and the balancer weight are integrally molded.

3. The balancer apparatus for the internal combustion engine according to claim 1, wherein the first bearing is press-fitted in the first bearing portion.

4. The balancer apparatus for the internal combustion engine according to claim 3, wherein the second bearing is press-fitted in the second bearing portion.

5. The balancer apparatus for the internal combustion engine according to claim 1, wherein at least one of the first bearing or the second bearing is a roller bearing.

6. The balancer apparatus for the internal combustion engine according to claim 5, wherein the roller bearing is a needle roller bearing.

7. The balancer apparatus for the internal combustion engine according to claim 3, wherein at least one of the first bearing or the second bearing is a rolled bush.

* * * * *